(12) United States Patent  
Pledger et al.

(10) Patent No.: US 8,157,900 B2  
(45) Date of Patent: *Apr. 17, 2012

(54) HYDROGEN-PROCESSING ASSEMBLIES AND HYDROGEN-PRODUCING SYSTEMS AND FUEL CELL SYSTEMS INCLUDING THE SAME

(75) Inventors: William A. Pledger, Bend, OR (US); Vernon Wade Popham, Bend, OR (US); R. Todd Studebaker, Chubbuck, ID (US); Kyle Taylor, Bend, OR (US)

(73) Assignee: Idatech, LLC, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/157,065

(22) Filed: Jun. 9, 2011

(65) Prior Publication Data

US 2011/0232491 A1    Sep. 29, 2011

Related U.S. Application Data

(63) Continuation of application No. 11/750,806, filed on May 18, 2007, now Pat. No. 7,972,420.

(60) Provisional application No. 60/802,716, filed on May 22, 2006.

(51) Int. Cl.  
*B01D 53/22* (2006.01)  
*C01B 3/02* (2006.01)

(52) U.S. Cl. ............... 96/4; 96/7; 96/11; 95/45; 95/55; 95/56; 48/61; 423/648.1; 423/651; 423/247; 429/411; 429/412; 429/423

(58) Field of Classification Search ............ 96/4, 7, 96/11; 95/45, 55, 56; 48/61; 423/644, 648.1, 423/651, 247; 422/187; 429/411, 412, 423  
See application file for complete search history.

(56) References Cited

U.S. PATENT DOCUMENTS

| | | | |
|---|---|---|---|
| 1,306,221 A | 6/1919 | Ellis | |
| 1,782,824 A | 11/1930 | Hechenbleikner | |
| 1,848,466 A | 3/1932 | Edmonds | |
| 2,132,151 A | 10/1938 | Fenske et al. | |
| 2,450,804 A | 10/1948 | Loy | |
| 2,609,059 A | 9/1952 | Benedict | |
| 2,824,620 A | 2/1958 | De Rosset | |
| 2,958,391 A * | 11/1960 | De Rosset | 95/56 |
| 3,094,391 A | 6/1963 | Mader | |

(Continued)

FOREIGN PATENT DOCUMENTS

CA    1238866    7/1988

(Continued)

OTHER PUBLICATIONS

English-language abstract of Japanese Patent No. 57-145276, 1982.

(Continued)

*Primary Examiner* — Jason M Greene  
(74) *Attorney, Agent, or Firm* — Dascenzo Intellectual Property Law, P.C.

(57) ABSTRACT

Hydrogen-processing assemblies, components of hydrogen-processing assemblies, and fuel-processing and fuel cell systems that include hydrogen-processing assemblies. The hydrogen-processing assemblies include a hydrogen-separation assembly positioned within the internal volume of an enclosure in a spaced relation to at least a portion of the internal perimeter of the body of the enclosure.

15 Claims, 7 Drawing Sheets

U.S. PATENT DOCUMENTS

| | | | |
|---|---|---|---|
| 3,144,312 A | 8/1964 | Mertens | |
| 3,208,198 A | 9/1965 | Rubin | |
| 3,336,730 A * | 8/1967 | Hovey et al. | 95/56 |
| 3,338,681 A | 8/1967 | Kordesch | |
| 3,344,586 A | 10/1967 | Langley et al. | |
| 3,350,176 A | 10/1967 | Green et al. | |
| 3,356,538 A | 12/1967 | Miekka et al. | |
| 3,368,329 A | 2/1968 | Eguchi et al. | |
| 3,428,476 A | 2/1969 | Langley et al. | |
| 3,439,474 A | 4/1969 | McKinley | |
| 3,447,288 A | 6/1969 | Juda et al. | |
| 3,450,500 A | 6/1969 | Setzer et al. | |
| 3,469,372 A | 9/1969 | Yamauchi et al. | |
| 3,469,944 A | 9/1969 | Bocard et al. | |
| 3,486,301 A | 12/1969 | Bonnet | |
| 3,520,803 A | 7/1970 | Iaconelli | |
| 3,522,019 A | 7/1970 | Buswell et al. | |
| 3,524,819 A | 8/1970 | Guerrieri | |
| 3,534,531 A | 10/1970 | Eguchi et al. | |
| 3,564,819 A | 2/1971 | Neulander et al. | |
| 3,589,171 A | 6/1971 | Haley | |
| 3,655,448 A | 4/1972 | Setzer | |
| 3,665,680 A | 5/1972 | Heuser | |
| 3,713,270 A | 1/1973 | Farr et al. | |
| 3,761,382 A | 9/1973 | Hammond et al. | |
| 3,782,904 A | 1/1974 | Fletcher | |
| 3,787,038 A | 1/1974 | Tesner et al. | |
| 3,791,106 A | 2/1974 | Haley | |
| 3,837,146 A | 9/1974 | Faure et al. | |
| 3,839,110 A | 10/1974 | Shankoff | |
| 3,849,076 A | 11/1974 | Gryaznov et al. | |
| 3,881,891 A | 5/1975 | Goltsov et al. | |
| 3,881,897 A | 5/1975 | Faure et al. | |
| 3,920,416 A | 11/1975 | Houseman | |
| 3,955,941 A | 5/1976 | Houseman et al. | |
| 3,972,695 A | 8/1976 | Buckley et al. | |
| 3,980,452 A | 9/1976 | Krumm et al. | |
| 3,982,910 A | 9/1976 | Houseman et al. | |
| 4,003,343 A | 1/1977 | Lee | |
| 4,003,725 A | 1/1977 | Bunn, Jr. et al. | |
| 4,056,373 A | 11/1977 | Rubin | |
| 4,078,985 A | 3/1978 | Takeuchi | |
| 4,084,934 A | 4/1978 | Kumazawa | |
| 4,098,959 A | 7/1978 | Fanciullo | |
| 4,098,960 A | 7/1978 | Gagnon | |
| 4,127,393 A | 11/1978 | Timmins et al. | |
| 4,132,668 A | 1/1979 | Gryaznov et al. | |
| 4,134,739 A | 1/1979 | Gulden et al. | |
| 4,175,165 A | 11/1979 | Adlhart | |
| 4,197,152 A | 4/1980 | Palty et al. | |
| 4,214,969 A | 7/1980 | Lawrance | |
| 4,238,403 A | 12/1980 | Pinto | |
| 4,243,536 A | 1/1981 | Prölss | |
| 4,248,688 A | 2/1981 | Gartner et al. | |
| 4,254,086 A | 3/1981 | Sanders | |
| 4,302,177 A | 11/1981 | Fankhanel et al. | |
| 4,313,013 A | 1/1982 | Harris | |
| 4,315,893 A | 2/1982 | McCallister | |
| 4,319,923 A | 3/1982 | Falanga et al. | |
| 4,329,157 A | 5/1982 | Dobo et al. | |
| 4,331,520 A | 5/1982 | Juda et al. | |
| 4,349,613 A | 9/1982 | Winsel | |
| 4,381,641 A | 5/1983 | Madgavkar et al. | |
| 4,387,434 A | 6/1983 | Moncrief, Jr. et al. | |
| 4,400,182 A | 8/1983 | Davies et al. | |
| 4,417,905 A | 11/1983 | Banks et al. | |
| 4,422,911 A | 12/1983 | Juda et al. | |
| 4,430,304 A | 2/1984 | Spurrier et al. | |
| 4,444,158 A | 4/1984 | Yoon | |
| 4,466,253 A | 8/1984 | Jaster | |
| 4,468,235 A | 8/1984 | Hill | |
| 4,472,176 A | 9/1984 | Rubin | |
| 4,473,622 A | 9/1984 | Chludzinski et al. | |
| 4,504,447 A | 3/1985 | Spurrier et al. | |
| 4,533,607 A | 8/1985 | Sederquist | |
| 4,553,981 A | 11/1985 | Fuderer | |
| 4,567,857 A | 2/1986 | Houseman et al. | |
| 4,589,891 A | 5/1986 | Iniotakis et al. | |
| 4,613,436 A | 9/1986 | Wight et al. | |
| 4,642,273 A | 2/1987 | Sasaki | |
| 4,644,751 A | 2/1987 | Hsu | |
| 4,650,814 A | 3/1987 | Keller | |
| 4,654,063 A | 3/1987 | Auvil et al. | |
| 4,655,797 A | 4/1987 | Iniotakis et al. | |
| 4,657,828 A | 4/1987 | Tajima | |
| 4,659,634 A | 4/1987 | Struthers | |
| 4,670,359 A | 6/1987 | Beshty et al. | |
| 4,684,581 A | 8/1987 | Struthers | |
| 4,693,945 A | 9/1987 | Ohyauchi et al. | |
| 4,699,637 A | 10/1987 | Iniotakis et al. | |
| 4,713,234 A | 12/1987 | Weirich et al. | |
| 4,751,151 A | 6/1988 | Healy et al. | |
| 4,781,241 A | 11/1988 | Misage et al. | |
| 4,788,004 A | 11/1988 | Pinto et al. | |
| 4,810,485 A | 3/1989 | Marianowski et al. | |
| 4,820,594 A | 4/1989 | Sugita et al. | |
| 4,838,897 A | 6/1989 | Amano et al. | |
| 4,849,187 A | 7/1989 | Uozu et al. | |
| 4,865,624 A | 9/1989 | Okada | |
| 4,880,040 A | 11/1989 | Pierson et al. | |
| 4,904,455 A | 2/1990 | Karafian et al. | |
| 4,904,548 A | 2/1990 | Tajima | |
| 4,946,667 A | 8/1990 | Beshty | |
| 4,981,676 A | 1/1991 | Minet et al. | |
| 4,999,107 A | 3/1991 | Guerif | |
| 5,030,661 A | 7/1991 | Lywood | |
| 5,032,365 A | 7/1991 | Aono et al. | |
| 5,051,113 A | 9/1991 | Nemser | |
| 5,126,045 A | 6/1992 | Kohlheb et al. | |
| 5,139,541 A | 8/1992 | Edlund | |
| 5,158,581 A | 10/1992 | Coplan | |
| 5,174,900 A | 12/1992 | Nichols et al. | |
| 5,205,841 A | 4/1993 | Vaiman | |
| 5,207,906 A | 5/1993 | Auvil et al. | |
| 5,210,059 A | 5/1993 | Matturo et al. | |
| 5,215,729 A | 6/1993 | Buxbaum | |
| 5,217,506 A | 6/1993 | Edlund et al. | |
| 5,225,080 A | 7/1993 | Karbachsch et al. | |
| 5,226,928 A | 7/1993 | Makabe et al. | |
| 5,229,102 A | 7/1993 | Minet et al. | |
| 5,259,870 A | 11/1993 | Edlund | |
| 5,306,577 A | 4/1994 | Sprouse | |
| 5,326,550 A | 7/1994 | Adris et al. | |
| 5,335,628 A | 8/1994 | Dunbar | |
| 5,344,721 A | 9/1994 | Sonai et al. | |
| 5,354,547 A | 10/1994 | Rao et al. | |
| 5,376,167 A | 12/1994 | Broutin et al. | |
| 5,382,271 A | 1/1995 | Ng et al. | |
| 5,393,325 A | 2/1995 | Edlund | |
| 5,395,425 A | 3/1995 | Brown | |
| 5,401,589 A | 3/1995 | Palmer et al. | |
| 5,417,051 A | 5/1995 | Ankersmit et al. | |
| RE35,002 E | 7/1995 | Matsubara et al. | |
| 5,432,710 A | 7/1995 | Ishimaru et al. | |
| 5,449,848 A | 9/1995 | Itoh | |
| 5,458,857 A | 10/1995 | Collins et al. | |
| 5,468,283 A | 11/1995 | French et al. | |
| 5,498,278 A | 3/1996 | Edlund | |
| 5,500,122 A | 3/1996 | Schwartz | |
| 5,509,942 A | 4/1996 | Dodge | |
| 5,516,344 A | 5/1996 | Corrigan | |
| 5,518,530 A | 5/1996 | Sakai et al. | |
| 5,520,807 A | 5/1996 | Myrna et al. | |
| 5,525,322 A | 6/1996 | Willms | |
| 5,527,632 A | 6/1996 | Gardner | |
| 5,536,405 A | 7/1996 | Myrna et al. | |
| 5,580,523 A | 12/1996 | Bard | |
| 5,589,599 A | 12/1996 | McMullen et al. | |
| 5,612,012 A | 3/1997 | Soma et al. | |
| 5,614,001 A | 3/1997 | Kosaka et al. | |
| 5,616,430 A | 4/1997 | Aoyama | |
| 5,634,354 A | 6/1997 | Howard et al. | |
| 5,637,259 A | 6/1997 | Galuszka et al. | |
| 5,637,414 A | 6/1997 | Inoue et al. | |
| 5,639,431 A | 6/1997 | Shirasaki et al. | |
| 5,645,626 A | 7/1997 | Edlund et al. | |
| 5,658,681 A | 8/1997 | Sato et al. | |

| | | | | | | |
|---|---|---|---|---|---|---|
| 5,674,301 A | 10/1997 | Sakai et al. | | 6,660,069 B2 | 12/2003 | Sato et al. |
| 5,677,073 A | 10/1997 | Kawatsu | | 6,719,831 B2 | 4/2004 | Edlund et al. |
| 5,679,249 A | 10/1997 | Fendya et al. | | 6,719,832 B2 | 4/2004 | Edlund et al. |
| 5,705,082 A | 1/1998 | Hinson | | 6,723,156 B2 | 4/2004 | Edlund et al. |
| 5,705,916 A | 1/1998 | Rudbeck et al. | | 6,761,755 B2 | 7/2004 | Jantsch et al. |
| 5,712,052 A | 1/1998 | Kawatsu | | 6,767,389 B2 | 7/2004 | Edlund et al. |
| 5,714,276 A | 2/1998 | Okamoto | | 6,783,741 B2 | 8/2004 | Edlund et al. |
| 5,734,092 A | 3/1998 | Wang et al. | | 6,824,593 B2 | 11/2004 | Edlund et al. |
| 5,738,708 A | 4/1998 | Peachey et al. | | 6,835,232 B2 | 12/2004 | Frost et al. |
| 5,741,474 A | 4/1998 | Isomura et al. | | 6,890,672 B2 | 5/2005 | Dickman et al. |
| 5,741,605 A | 4/1998 | Gillett et al. | | 7,972,420 B2 * | 7/2011 | Pledger et al. .............. 96/4 |
| 5,759,712 A | 6/1998 | Hockaday | | 2002/0103453 A1 | 8/2002 | Burbank et al. |
| 5,780,179 A | 7/1998 | Okamoto | | 2003/0167690 A1 | 9/2003 | Edlund et al. |
| 5,782,960 A | 7/1998 | Ogawa et al. | | 2004/0003720 A1 | 1/2004 | Beisswenger et al. |
| 5,795,666 A | 8/1998 | Johnssen | | 2004/0083890 A1 | 5/2004 | Edlund et al. |
| 5,798,186 A | 8/1998 | Fletcher et al. | | 2004/0126643 A1 | 7/2004 | Kinkelaar et al. |
| 5,811,065 A | 9/1998 | Sterenberg | | 2004/0148857 A1 | 8/2004 | Strizki et al. |
| 5,814,112 A | 9/1998 | Elliot et al. | | 2004/0155065 A1 | 8/2004 | Kinkelaar et al. |
| 5,821,185 A | 10/1998 | White et al. | | 2004/0231516 A1 | 11/2004 | Edlund et al. |
| 5,833,723 A | 11/1998 | Kuwabara et al. | | 2004/0241509 A1 | 12/2004 | Taguchi et al. |
| 5,858,314 A | 1/1999 | Hsu et al. | | 2005/0039400 A1 | 2/2005 | Lau et al. |
| 5,861,137 A | 1/1999 | Edlund | | 2005/0188843 A1 | 9/2005 | Edlund et al. |
| 5,874,051 A | 2/1999 | Heil et al. | | 2006/0037476 A1 | 2/2006 | Edlund et al. |
| 5,888,273 A | 3/1999 | Buxbaum | | 2006/0060084 A1 | 3/2006 | Edlund et al. |
| 5,891,222 A | 4/1999 | Hilgendorff et al. | | 2006/0090397 A1 | 5/2006 | Edlund et al. |
| 5,897,766 A | 4/1999 | Kawatsu | | | | |
| 5,897,970 A | 4/1999 | Isomura et al. | | FOREIGN PATENT DOCUMENTS | | |
| 5,904,754 A | 5/1999 | Juda et al. | | EP 0434562 A1 | | 6/1991 |
| 5,931,987 A | 8/1999 | Buxbaum | | EP 1065741 A2 | | 1/2001 |
| 5,932,181 A | 8/1999 | Kim et al. | | JP 45-14404 | | 5/1970 |
| 5,938,800 A | 8/1999 | Verrill et al. | | JP 45-2642 | | 9/1970 |
| 5,980,989 A | 11/1999 | Takahashi et al. | | JP 57-145276 | | 9/1982 |
| 5,985,474 A | 11/1999 | Chen et al. | | JP S62-143801 | | 6/1987 |
| 5,997,594 A | 12/1999 | Edlund et al. | | JP 1-145302 | | 6/1989 |
| 5,998,053 A | 12/1999 | Diethelm | | JP 1-145303 | | 6/1989 |
| 6,001,249 A | 12/1999 | Bailey et al. | | JP 1-262903 | | 10/1989 |
| 6,007,931 A | 12/1999 | Fuller et al. | | JP 4-163860 | | 6/1992 |
| 6,042,956 A | 3/2000 | Lenel | | JP 4-338101 | | 11/1992 |
| 6,045,772 A | 4/2000 | Szydlowski et al. | | JP 6-134244 | | 5/1994 |
| 6,045,933 A | 4/2000 | Okamoto | | JP H08-040703 | | 2/1996 |
| 6,054,229 A | 4/2000 | Hsu et al. | | JP 10-263372 | | 10/1998 |
| 6,077,620 A | 6/2000 | Pettit | | JP 2000-034108 | | 2/2000 |
| 6,083,637 A | 7/2000 | Walz et al. | | JP 2001-137674 | | 5/2001 |
| 6,103,028 A | 8/2000 | Juda et al. | | JP 2002-045637 | | 2/2002 |
| 6,103,411 A | 8/2000 | Matsubayashi et al. | | WO WO 97/25649 | | 7/1997 |
| 6,152,995 A | 11/2000 | Edlund | | WO WO 97/43796 | | 11/1997 |
| 6,165,633 A | 12/2000 | Negishi | | WO WO 99/30806 | | 6/1999 |
| 6,168,650 B1 | 1/2001 | Buxbaum | | WO WO 99/65097 | | 12/1999 |
| 6,171,574 B1 | 1/2001 | Juda et al. | | WO WO 00/04600 | | 1/2000 |
| 6,180,272 B1 | 1/2001 | Byrne et al. | | WO WO 00/27507 | | 5/2000 |
| 6,183,543 B1 | 2/2001 | Buxbuam | | WO WO 01/12539 | | 2/2001 |
| 6,183,895 B1 | 2/2001 | Kudo et al. | | WO WO 01/28662 | | 4/2001 |
| 6,187,066 B1 | 2/2001 | Benz et al. | | WO WO 01/64321 | | 9/2001 |
| 6,190,623 B1 | 2/2001 | Sanger et al. | | WO WO 01/83086 | | 11/2001 |
| 6,201,029 B1 | 3/2001 | Waycuilis | | | | |
| 6,221,117 B1 | 4/2001 | Edlund et al. | | OTHER PUBLICATIONS | | |

6,231,831 B1 5/2001 Autenrieth et al.
6,238,465 B1 5/2001 Juda et al.
6,242,120 B1 6/2001 Herron
6,319,306 B1 11/2001 Edlund et al.
6,332,913 B1 12/2001 Breitschwerdt et al.
6,350,297 B1 2/2002 Doyle et al.
6,375,906 B1 4/2002 Edlund et al.
6,376,113 B1 4/2002 Edlund et al.
6,379,524 B1 4/2002 Lee et al.
6,383,670 B1 5/2002 Edlund et al.
6,395,405 B1 5/2002 Buxbaum
6,419,726 B1 7/2002 Frost et al.
6,458,189 B1 10/2002 Edlund et al.
6,461,408 B2 10/2002 Buxbaum
6,494,937 B1 12/2002 Edlund et al.
6,495,277 B1 12/2002 Edlund et al.
6,537,352 B2 3/2003 Edlund et al.
6,547,858 B1 4/2003 Edlund et al.
6,562,111 B2 5/2003 Edlund et al.
6,569,227 B2 5/2003 Edlund et al.
6,596,057 B2 7/2003 Edlund et al.
6,602,325 B1 8/2003 Frost et al.
6,632,270 B2 10/2003 Edlund et al.

English-language abstract of Japanese Patent No. 1-145302, 1989.
English-language abstract of Japanese Patent No. 1-145303, 1989.
English-language abstract of Japanese Patent No. 1-262903, 1989.
English-language abstract of Japanese Patent No. 4-163860, Jun. 1992.
English-language abstract of Japanese Patent No. 432150, 1992.
English-language abstract of Japanese Patent No. 4-338101, 1992.
English-language abstract of Japanese Patent No. 5132301, 1993.
English-language abstract of Japanese Patent No. 5147902, 1993.
English-language abstract of Japanese Patent No. 6040701, 1994.
English-language abstract of Japanese Patent No. 6-134244, 1994.
English-language abstract of Japanese Patent No. 6176779, 1994.
English-language abstract of Japanese Patent No. 6345408, 1994.
English-language abstract of Japanese Patent No. 710910, 1995.
English-language abstract of Japanese Patent No. 7057758, 1995.
English-language abstract of Japanese Patent No. 8-287932, 1996.
English-language abstract of German language PCT Patent Publication No. WO 97/43796, 1997.
English-language abstract of Great Britain Patent No. 2,305,186, 1997.

English language abstract of Japanese Patent No. 10-263372, 1998.
English-language abstract of Japanese Patent No. 11116202, 1999.
English-language abstract of German language PCT Patent Publication Serial No. WO 00/04600, Jan. 2000.
English-language abstract of German language PCT Patent Application Serial No. WO 01/64321, 2001.
Adris, A. M., et al., "A Fluidized Bed Membrane Reactor for the Steam Reforming of Methane," The Canadian Journal of Chemical Engineering, vol. 69, pp. 1061-1070 (Oct. 1991).
Amphlett, J. C., et al., "On Board Hydrogen Purification for Steam Reformer/PEM Fuel Cell Vehicle Power Plants," Energy Progress X, Proceedings of the 10$^{th}$ World Hydrogen Energy Conference, Cocoa Beach, Florida, U.S.A., vol. 3, pp. 1681-1690 (Jun. 1994).
Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22-25, 1997).
Chai, M., et al., "Promotion of Methane Steam Reforming Using Ruthenium-Dispersed Microporous Alumina Membrane Reactor," Chemistry Letters, The Chemical Society of Japan, pp. 41-44 (1993).
"Compact, Lightweight Fuel Reformer for Fuel Cells," Argonne National Laboratory/U.S. Department of Energy (Jul. 1996).
Edlund, Dr. David and William Pledger, "Development of a Compact and Economical Steam Reformer for Fuel-Cell Systems," Fifth Grove Fuel Cell Symposium, Commonwealth Institute, London, U.K., p. 6 (Sep. 22-23, 1997).
Edlund, David J. and William A. Pledger, "The Practical Use of Metal-Membrane Reactors for Industrial Applications," The 1995 Membrane Technology Reviews, pp. 89-97 (Nov. 1994).
Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).
Emonts, B., et al., "Compact Methanol Reformer Test for Fuel-Cell Powered Light-Duty Vehicles," Fifth Grove Fuel Cell Symposium, Commonwealth Institute, London, U.K., (no p. No.), (Sep. 22-25, 1997).
Jørgensen, S. Lægsgaard, et al., "Application of Pd-Membranes for the Production of Pure Hydrogen in Methanol-Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51-57 (May 30-31, 1997).
Knapton, A. G., "Palladium Alloys for Hydrogen Diffusion Membranes," Platinum Metals Review, vol. 21, 44-50 (1977).

Ledjeff-Hey, K., et al., "Compact Hydrogen Production Systems for Solid Polymer Fuel Cells," Fifth Grove Fuel Cell Symposium, Commonwealth Institute, London, U.K., p. 17 (Sep. 22-25, 1997).
Menzer, R., et al., "Fuel Processing in Fuel Cell Systems for Mobile Applications—Gasoline as Energy Carrier On-Bord," Fifth Grove Fuel Cell Symposium, Commonwealth Institute, London, U.K., (no p. No.), (Sep. 22-25, 1997).
Minet, R. G., et al., "Experimental Studies of a Ceramic Membrane Reactor for the Steam/Methane Reaction at Moderate Temperatures (400-700° C)," Symposium on Natural Gas Upgrading II Presented before The Division of Petroleum Chemistry, Inc., Meeting of American Chemical Society, San Francisco, California, U.S.A., pp. 245-248 (Apr. 1992).
Oertel, Michael, et al., "Steam Reforming of Natural Gas with Integrated Hydrogen Separation for Hydrogen Production," Chemical Engineering Techology, vol. 10, pp. 248-255 (1987).
Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.
Privette et al., "Status of SOFCo SOFC Technology Development," presented at the 1996 Fuel Cell Seminar held Nov. 17-20, 1996 in Orlando, Florida, pp. 206-209.
Shu, J., et al., "Catalytic Palladium-Based Membrane Reactors: A Review," The Canadian Journal of Chemical Engineering, vol. 69, pp. 1036-1060 (Oct. 1991).
Teagan, W. P., et al., "Cost Reduction of Fuel Cells for Transportation Applications—Fuel Processing Options," Fifth Grove Fuel Cell Symposium, Commonwealth Institute, London, U.K. (Sep. 22-25, 1997).
English-language abstract of Patent Publication No. JP 2002-045637, 2002.
English-language abstract of Patent Publication No. JP 2001-137674, 2001.
English-language abstract of Patent Publication No. JP 2000-034108, 2000.
English-language abstract of Patent Publication No. JP H08-040703, 1996.
English-language abstract of Patent Publication No. JP S62-143801, 1987.
US 6,340,380, 01/2002, Frost et al. (withdrawn)

* cited by examiner

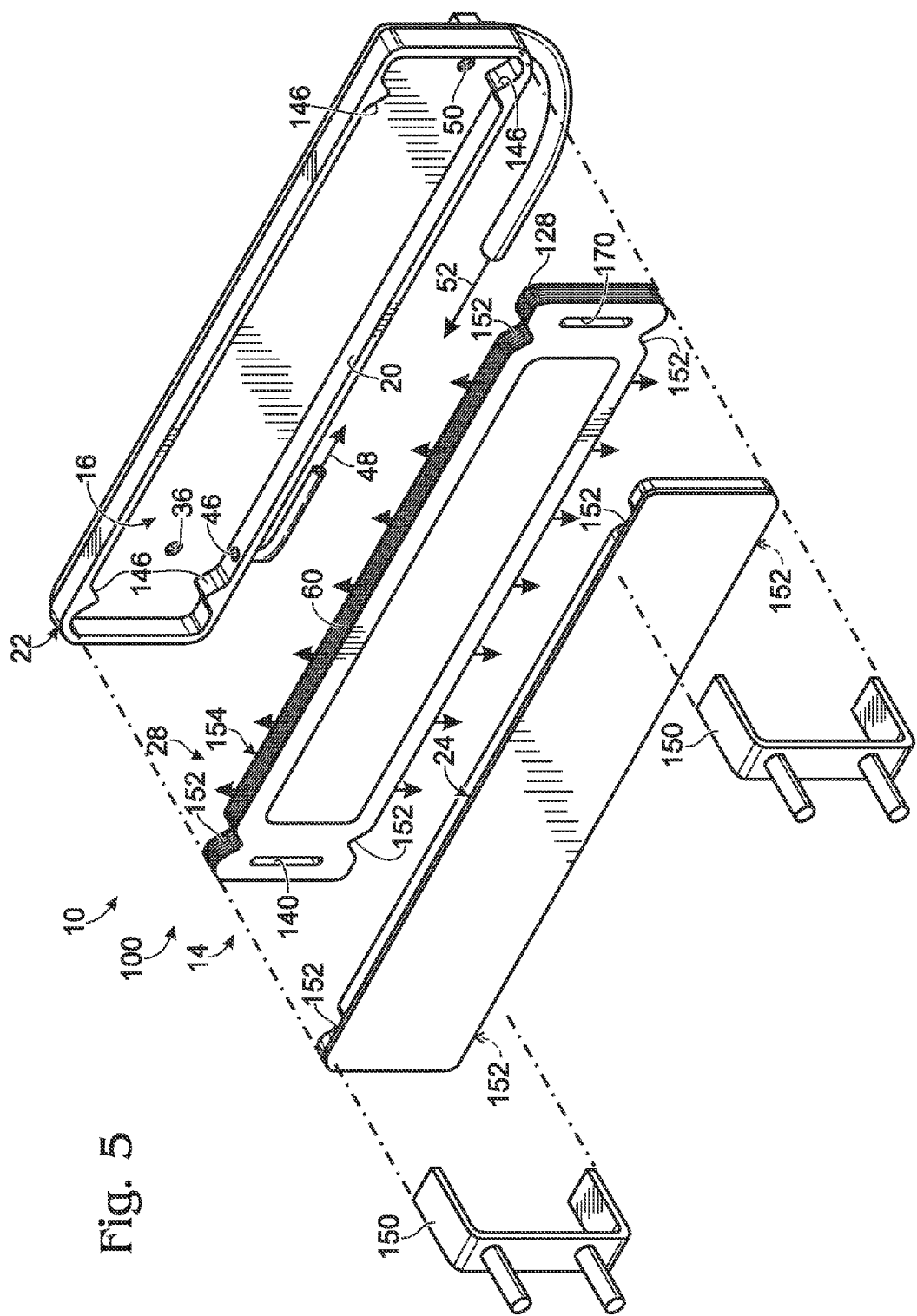

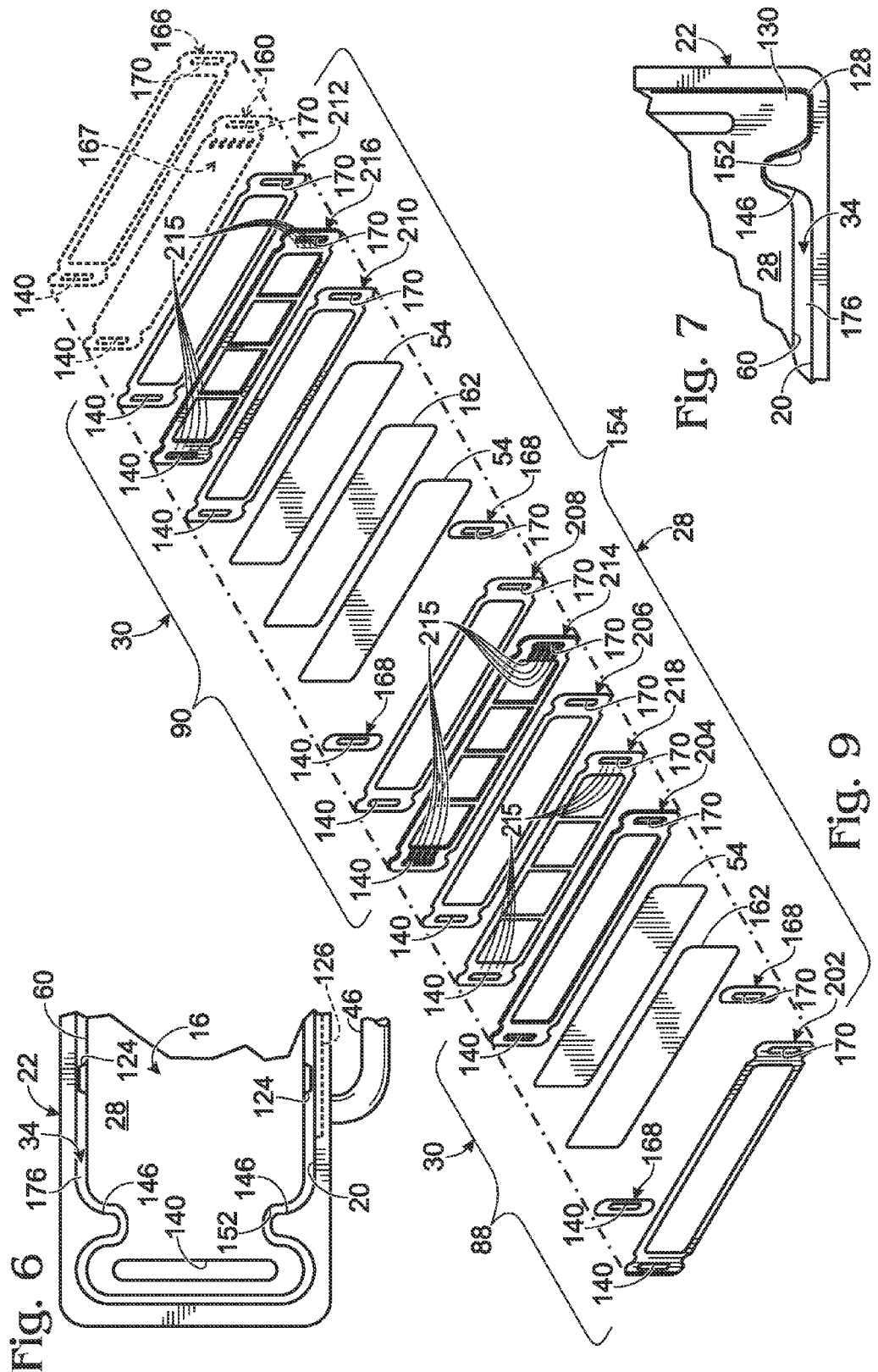

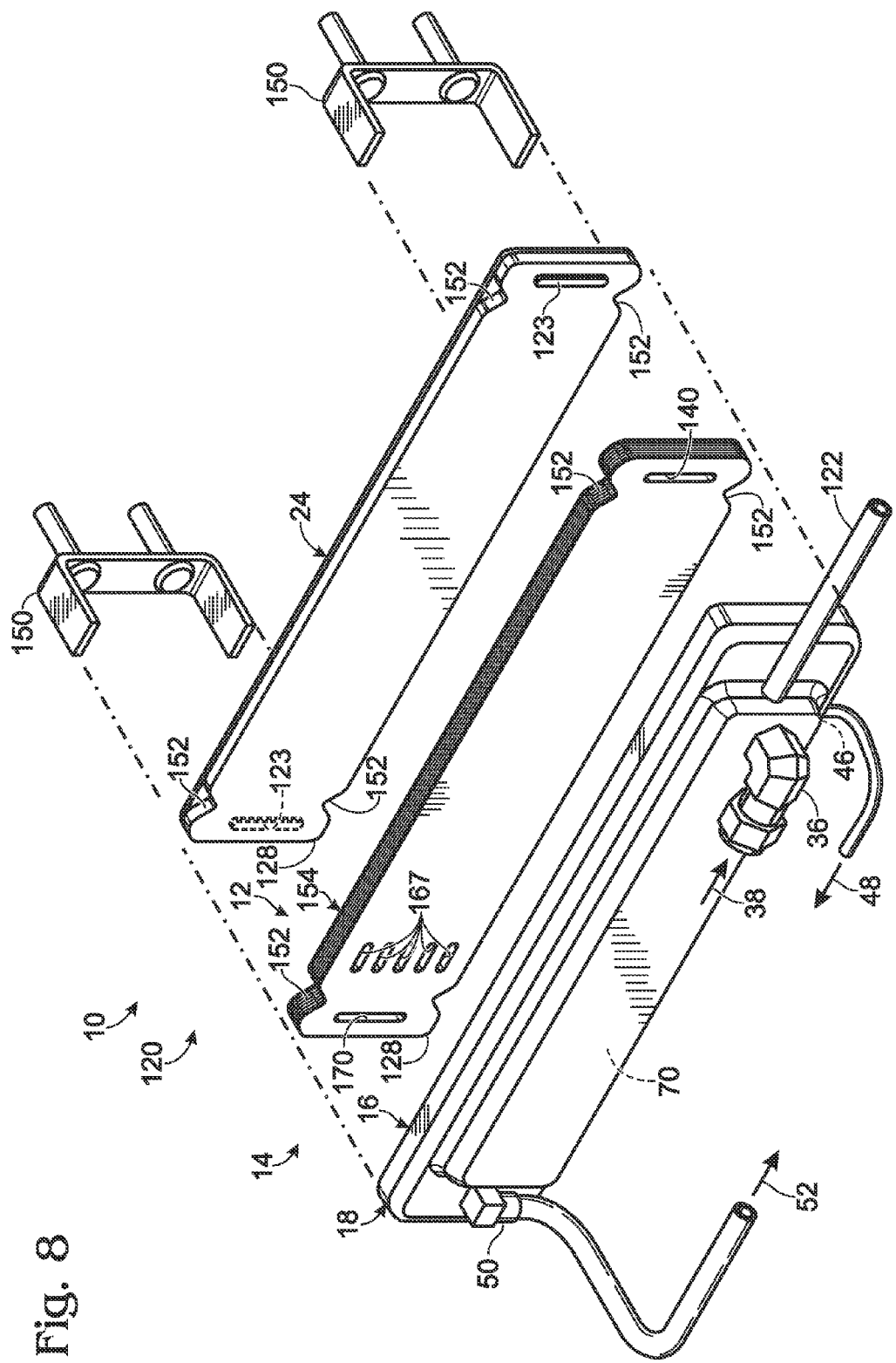

US 8,157,900 B2

HYDROGEN-PROCESSING ASSEMBLIES AND HYDROGEN-PRODUCING SYSTEMS AND FUEL CELL SYSTEMS INCLUDING THE SAME

RELATED APPLICATIONS

This application is a continuing patent application that claims priority to Non-Provisional U.S. patent application Ser. No. 11/750,806, which was filed on May 18, 2007, and which claims priority to U.S. Provisional Patent Application Ser. No. 60/802,716, which was filed on May 22, 2006. The entire disclosures of the above-identified patent applications are hereby incorporated by reference.

TECHNICAL FIELD

The present disclosure relates generally to hydrogen-processing assemblies, and more particularly to hydrogen-processing assemblies and components thereof for purifying hydrogen gas.

BACKGROUND OF THE DISCLOSURE

Purified hydrogen gas is used in the manufacture of many products including metals, edible fats and oils, and semiconductors and microelectronics. Purified hydrogen gas also is an important fuel source for many energy conservation devices. For example, fuel cells use purified hydrogen gas and an oxidant to produce electrical potential. Various processes and devices may be used to produce hydrogen gas. However, many hydrogen-producing processes produce an impure hydrogen gas stream, which may also be referred to as a mixed gas stream that contains hydrogen gas and other gases. Prior to delivering this stream to a fuel cell stack or other hydrogen-consuming device, the mixed gas stream may be purified, such as to remove at least a portion of the other gases.

A suitable mechanism for increasing the hydrogen purity of the mixed gas stream is to utilize at least one hydrogen-selective membrane to separate the mixed gas stream into a product stream and a byproduct stream. The product stream contains a greater concentration of hydrogen gas and/or a reduced concentration of one or more of the other gases than the mixed gas stream. The byproduct stream contains at least a substantial portion of one or more of the other gases from the mixed gas stream. Hydrogen purification using one or more hydrogen-selective membranes is a pressure driven separation process, in which the one or more hydrogen-selective membranes are contained in a pressure vessel. The mixed gas stream contacts the mixed gas surface of the membrane(s), and the product stream is formed from at least a portion of the mixed gas stream that permeates through the membrane(s). The byproduct stream is formed from at least a portion of the mixed gas stream that does not permeate through the membrane(s). The pressure vessel is typically sealed to prevent gases from entering or leaving the pressure vessel except through defined inlet and outlet ports or conduits.

BRIEF DESCRIPTION OF THE DRAWINGS

FIG. 5 is an exploded view of an illustrative, non-exclusive example of a hydrogen-processing assembly according to the present disclosure.

FIG. 6 is a fragmentary plan view of portions of the enclosure and the hydrogen-separation assembly of FIG. 5.

FIG. 7 is a fragmentary plan view of portions of the enclosure and the hydrogen-separation assembly of FIG. 5.

FIG. 8 is an exploded view of an illustrative, non-exclusive example of another hydrogen-processing assembly according to the present disclosure that includes a hydrogen-producing region.

FIG. 9 is an exploded isometric view of an illustrative, non-exclusive example of another hydrogen-separation assembly according to the present disclosure.

DETAILED DESCRIPTION AND BEST MODE OF THE DISCLOSURE

Figure 1:
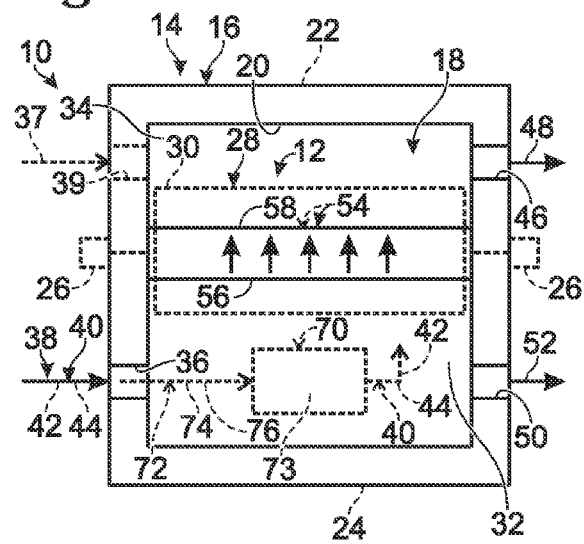
FIG. 1 is a schematic cross-sectional view of a hydrogen-processing assembly according to the present disclosure.

An illustrative, non-exclusive example of a hydrogen-processing assembly according to the present disclosure is schematically illustrated in cross-section in FIG. 1 and generally indicated at 10. Assembly 10 includes a hydrogen-separation region 12 and an enclosure 14. Enclosure 14 includes a body 16 that defines an internal volume 18 having an internal perimeter 20.

Enclosure 14 may include at least a first portion 22 and a second portion 24 coupled together to form body 16 in the form of a sealed pressure vessel that includes defined input and output ports that define fluid paths by which gases or other fluids are delivered into and removed from the enclosure's internal volume. First and second portions 22, 24 may be coupled together using any suitable retention mechanism, or structure, 26. Examples of suitable structures 26 include welds and/or bolts, although any suitable retention mechanism is within the scope of the present disclosure. Examples of seals that may be used to provide a fluid-tight interface between first and second portions 22, 24 include, but are not limited to, gaskets and/or welds. Additionally or alternatively, first and second portions 22, 24 may be secured together so that at least a predetermined amount of compression is applied to various components that define the hydrogen-separation region within the enclosure and/or other components that may be incorporated into a hydrogen-processing assembly according to the present disclosure. In other words, first and second portions 22, 24, when secured together by a suitable retention mechanism or structure, may apply compression to various components that define the hydrogen-separation region and/or other components housed within an enclosure of a hydrogen-processing assembly, thereby maintaining an appropriate position of the various components within the enclosure. Additionally or alternatively, the compression applied to the various components that define the hydrogen-separation region and/or other components may provide fluid-tight interfaces between the various components that define the hydrogen-separation region, various other components, and/or between the components that define the hydrogen-separation region and other components.

Enclosure 14 includes a mixed gas region 32 and a permeate region 34. The mixed gas and permeate regions are separated by hydrogen-separation region 12. At least one input port 36 is provided, through which a fluid stream 38 is delivered to the enclosure. In the schematically illustrated example shown in FIG. 1, fluid stream 38 is indicated to be a mixed gas stream 40 that contains hydrogen gas 42 and other gases 44 that are delivered to mixed gas region 32. Hydrogen gas may be a majority component of the mixed gas stream. As somewhat schematically illustrated in FIG. 1, hydrogen-separation region 12 extends between mixed gas region 32 and permeate region 34 so that gas in the mixed gas region must pass through the hydrogen-separation region in order to enter the permeate region. As discussed in more detail herein, this may require the gas to pass through at least one hydrogen-selective membrane. The permeate and mixed gas regions may be of any suitable relative size within the enclosure.

Enclosure 14 also includes at least one product output port 46, through which a permeate stream 48 is removed from permeate region 34. The permeate stream contains at least one of a greater concentration of hydrogen gas and a lower concentration of the other gases than the mixed gas stream. It is within the scope of the present disclosure that permeate stream 48 may (but is not required to) also at least initially include a carrier, or sweep, gas component, such as may be delivered as a sweep gas stream 37 through a sweep gas port 39 that is in fluid communication with the permeate region. The enclosure also includes at least one byproduct output port 50, through which a byproduct stream 52 containing at least one of a substantial portion of the other gases 44 and a reduced concentration of hydrogen gas (relative to the mixed gas stream) is removed from the mixed gas region 32.

Hydrogen-separation region 12 includes at least one hydrogen-selective membrane 54 having a first, or mixed gas, surface 56, which is oriented for contact by mixed gas stream 40, and a second, or permeate, surface 58, which is generally opposed to surface 56. Accordingly, in the schematically illustrated example of FIG. 1, mixed gas stream 40 is delivered to the mixed gas region of the enclosure so that it comes into contact with the mixed gas surface of the one or more hydrogen-selective membranes. Permeate stream 48 is formed from at least a portion of the mixed gas stream that passes through the hydrogen-separation region to permeate region 34. Byproduct stream 52 is formed from at least a portion of the mixed gas stream that does not pass through the separation region. In some embodiments, byproduct stream 52 may contain a portion of the hydrogen gas present in the mixed gas stream. The separation region may (but is not required to) also be adapted to trap or otherwise retain at least a portion of the other gases, which may then be removed as a byproduct stream as the separation region is replaced, regenerated, or otherwise recharged.

In FIG. 1, streams 37, 40, 48, and 52 schematically represent that each of these streams may include more than one actual stream flowing into or out of assembly 10. For example, assembly 10 may receive a plurality of mixed gas streams 40, a single mixed gas stream 40 that is divided into two or more streams prior to contacting separation region 12, a single stream that is delivered into internal volume 18, etc. Accordingly, enclosure 14 may include more than one input port 36. Similarly, an enclosure 14 according to the present disclosure may include more than one sweep gas port 39, more than one product outlet port 46, and/or more than one byproduct outlet port 50.

The hydrogen-selective membranes may be formed of any hydrogen-permeable material suitable for use in the operating environment and parameters in which hydrogen-processing assembly 10 is operated. Illustrative, non-exclusive examples of suitable materials for membranes 54 are disclosed in U.S. Pat. Nos. 6,537,352 and 5,997,594, and in U.S. Provisional Patent Application Ser. No. 60/854,058, the entire disclosures of which are incorporated herein by reference for all purposes. In some embodiments, the hydrogen-selective membranes may be formed from at least one of palladium and a palladium alloy. Illustrative, non-exclusive examples of palladium alloys include alloys of palladium with copper, silver, and/or gold. However, the membranes may be formed from other hydrogen-permeable and/or hydrogen-selective materials, including metals and metal alloys other than palladium and palladium alloys. Illustrative examples of various membranes, membrane configurations, and methods for preparing the same are disclosed in U.S. Pat. Nos. 6,152,995, 6,221,117, 6,319,306, and 6,537,352, the complete disclosures of which are incorporated herein by reference for all purposes.

In some embodiments, a plurality of spaced-apart hydrogen-selective membranes 54 may be used in a hydrogen-separation region to form at least a portion of a hydrogen-separation assembly 28. When present, the plurality of membranes may collectively define one or more membrane assemblies, or membrane assemblies, 30. In such embodiments, the hydrogen-separation assembly 28 may generally extend from first portion 22 to second portion 24. Accordingly, the first and second portions of the enclosure may effectively compress the hydrogen-separation assembly. Other configurations of enclosure 14 are equally within the scope of the present disclosure. For example, in some embodiments, enclosure 14 may additionally or alternatively include end plates coupled to opposite sides of a body portion. In such embodiments, the end plates may effectively compress the hydrogen-separation assembly 28 (and other components that may be housed within the enclosure) between the pair of opposing end plates.

Hydrogen purification using one or more hydrogen-selective membranes is typically a pressure-driven separation process in which the mixed gas stream is delivered into contact with the mixed gas surfaces of the membranes at a higher pressure than the gases in the permeate region of the hydrogen-separation region. Although not required to all embodiments, the hydrogen-separation region may be heated via any suitable mechanism to an elevated temperature when the hydrogen-separation region is utilized to separate the mixed gas stream into the permeate and byproduct streams. Illustrative, non-exclusive examples of suitable operating temperatures for hydrogen purification using palladium and palladium alloy membranes include temperatures of at least 275° C., temperatures of at least 325° C., temperatures of at least 350° C., temperatures in the range of 275-500° C., temperatures in the range of 275-375° C., temperatures in the range of 300-450° C., temperatures in the range of 350-450° C., and the like.

In some embodiments, and as schematically illustrated in FIG. 1, hydrogen-processing assemblies 10 may, though are not required to, further include a hydrogen-producing region 70. Illustrative, non-exclusive examples of hydrogen-producing regions suitable for incorporation in hydrogen-processing assemblies 10 of the present disclosure are disclosed in U.S. patent application Ser. No. 11/263,726 and U.S. Provisional Patent Application Ser. No. 60/802,716, the complete disclosures of which are hereby incorporated by reference for all purposes. In such embodiments, the first and second portions 22, 24 of body 16 may effectively compress both the hydrogen-separation assembly and one or more components of the hydrogen-producing region.

In embodiments incorporating a hydrogen-producing region 70, the fluid stream (38) that is delivered to the internal volume of enclosure 14 may be in the form of one or more hydrogen-producing fluids, or feed streams, 72. The feed stream, or streams, are delivered to the hydrogen-producing region 70, which may include a suitable catalyst 73 for catalyzing the formation of hydrogen gas from the feed stream(s) delivered thereto. Illustrative, non-exclusive examples of feed stream(s) 72 include water 74 and/or a carbon-containing feedstock 76, which (when present) may be delivered in the same or separate fluid streams.

In the hydrogen-producing region, the feed stream(s) chemically react to produce hydrogen gas therefrom in the form of mixed gas stream 40. In other words, rather than receiving mixed gas stream 40 from an external source (as schematically illustrated in a solid arrow in FIG. 1), hydrogen-processing assemblies 10 according to the present disclosure may optionally include a hydrogen-producing region 70 that is housed within enclosure 14 itself. This hydrogen-producing region produces mixed gas stream 40 (schematically illustrated as a dashed arrow in FIG. 1) containing hydrogen gas 42 and other gases 44 within the enclosure, and this mixed gas stream is then delivered to mixed gas region 32 and separated into permeate and byproduct streams by hydrogen-separation region 12, as discussed above and schematically illustrated in FIG. 1.

Illustrative, non-exclusive examples of suitable mechanisms for producing mixed gas stream 40 from one or more feed stream(s) include steam reforming and autothermal reforming, in which reforming catalysts are used to produce hydrogen gas from at least one feed stream 72 containing water 74 and a carbon-containing feedstock 76. In a steam reforming process, hydrogen-producing region 70 may be referred to as a reforming region, and output, or mixed gas, stream 40 may be referred to as a reformate stream. The other gases that are typically present in the reformate stream include carbon monoxide, carbon dioxide, methane, steam, and/or unreacted carbon-containing feedstock. In an autothermal reforming reaction, a suitable autothermal reforming catalyst is used to produce hydrogen gas from water and a carbon-containing feedstock in the presence of air. When autothermal reforming is used, the fuel processor further includes an air delivery assembly that is adapted to deliver an air stream to the hydrogen-producing region. Autothermal hydrogen-producing reactions utilize a primary endothermic reaction that is utilized in conjunction with an exothermic partial oxidation reaction, which generates heat within the hydrogen-producing region upon initiation of the initial oxidation reaction.

Illustrative, non-exclusive examples of other suitable mechanisms for producing hydrogen gas include pyrolysis and catalytic partial oxidation of a carbon-containing feedstock, in which case the feed stream includes a carbon-containing feedstock and does not (or does not need to) contain water. A further illustrative, non-exclusive example of a mechanism for producing hydrogen gas is electrolysis, in which case the feed stream includes water but not a carbon-containing feedstock. Illustrative, non-exclusive examples of suitable carbon-containing feedstocks include at least one hydrocarbon or alcohol. Illustrative, non-exclusive examples of suitable hydrocarbons include methane, propane, butane, natural gas, diesel, kerosene, gasoline and the like. Illustrative, non-exclusive examples of suitable alcohols include methanol, ethanol, and polyols, such as ethylene glycol and propylene glycol. It is within the scope of the present disclosure that a hydrogen-processing assembly 10 that includes a hydrogen-producing region 70 may utilize more than a single hydrogen-producing mechanism in the hydrogen-producing region.

Figure 2:
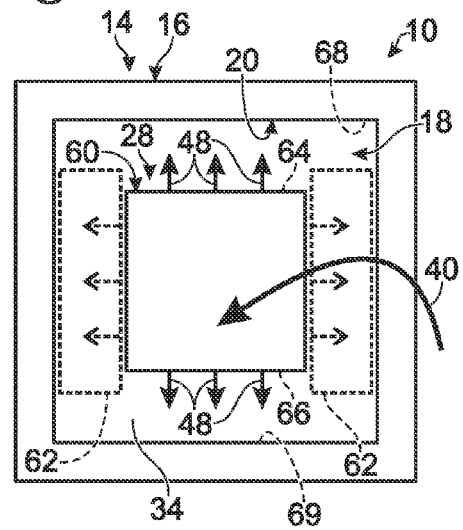
FIG. 2 is a schematic cross-sectional view of a hydrogen-processing assembly according to the present disclosure.

FIG. 2 schematically illustrates an illustrative, non-exclusive example of a hydrogen-processing assembly 10 from a slightly different perspective than schematically illustrated in FIG. 1. That is, FIG. 2 may be described as a schematic plan view of a cross-section of an illustrative, non-exclusive example of a hydrogen-processing assembly 10. In FIG. 2, hydrogen-separation assembly 28 is positioned within internal volume 18 of enclosure 14 in a spaced relation to at least a portion of internal perimeter 20 of body 16. Hydrogen-separation assembly 28 may be described as having an outer perimeter 60. For hydrogen-separation assemblies containing one or more planar, or generally planar, membranes, this outer perimeter may be described as being measured in, or parallel to, the plane of the membrane(s). That is, outer perimeter 60 may refer to at least a portion of the generally external surface of a hydrogen-separation region, hydrogen-separation assembly, or membrane assembly. Accordingly, in the example schematically illustrated in FIG. 2, the permeate region 34 may be described as being defined between at least a portion of the outer perimeter 60 and at least a portion of the internal perimeter 20 of body 16. In such embodiments, the permeate region is in direct fluid communication with the internal perimeter of the body. Stated differently, the permeate stream 48 exits hydrogen-separation region 28 directly into the internal volume 18 of the enclosure 14.

Various configurations of the relation between hydrogen-separation assembly 28 and internal perimeter 20 are within the scope of the present disclosure. For example, and as schematically illustrated in FIG. 2, permeate region 34 may be defined between an entire outer perimeter (that is, an entire perimeter as viewed from a specific cross-section but not necessarily the entire outer surface) of hydrogen-separation assembly 28 and at least a portion of internal perimeter 20 of enclosure body 16. Additionally or alternatively, the permeate region may be defined between at least a majority of an outer perimeter of the hydrogen-separation assembly and at least a portion of the internal perimeter of the enclosure body. For example, and as discussed above, in some embodiments, the hydrogen-separation assembly is directly or indirectly compressed between portions of the enclosure, and therefore the portions of the outer perimeter or outer surface of the hydrogen-separation assembly that are in direct or indirect contact with the enclosure body may not define a portion of the permeate region. Additionally or alternatively, and as schematically illustrated in dashed lines in FIG. 2, additional structure 62 may prevent a portion of the outer perimeter of the hydrogen-separation assembly and a portion of the internal perimeter of the body from defining the permeate region. In some such embodiments, the outer perimeter of the hydrogen-separation assembly may be described as having two generally opposed portions 64, 66, and the permeate region therefore defined between at least two generally opposed portions 68, 69 of internal perimeter 20 of body 16 and the two generally opposed portions 64, 66 of outer perimeter 60 of the hydrogen-separation assembly.

Additionally or alternatively, in embodiments where enclosure 14 includes at least a first portion and a second portion coupled together to form body 16, the spaced relation of the hydrogen-separation assembly and at least a portion of internal perimeter 20 of the enclosure body 16 may be maintained by the compression between the first and second portions of the body. In other words, to maintain the spaced relation between the hydrogen-separation assembly and the enclosure body, hydrogen-processing assembly 10 may be assembled so that the compression between the body portions generally prevents the hydrogen-separation assembly from moving within the enclosure relative to the body.

Figure 3:
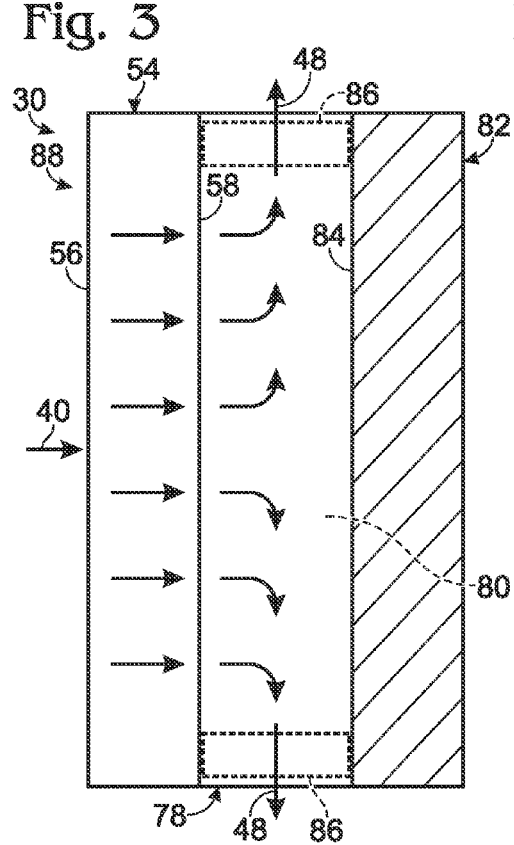
FIG. 3 is a schematic cross-sectional view of a membrane assembly according to the present disclosure.
Figure 4:
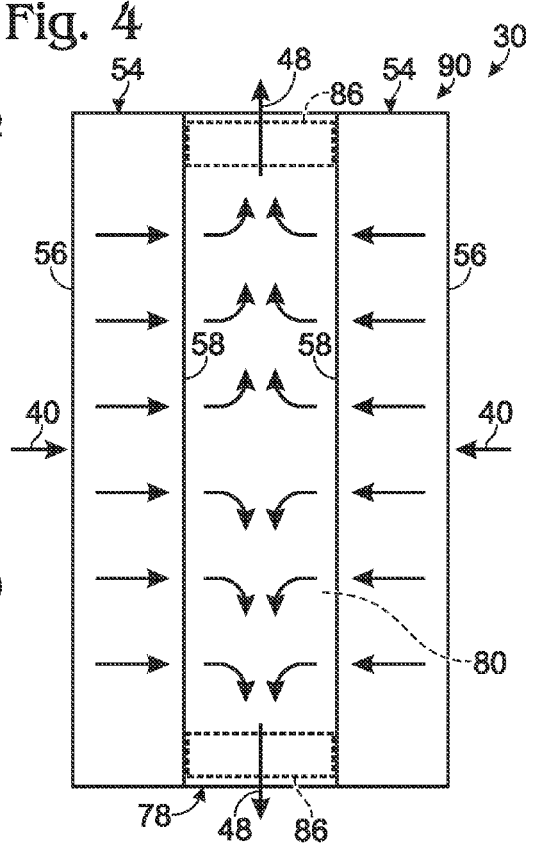
FIG. 4 is a schematic cross-sectional view of another membrane assembly according to the present disclosure.

FIGS. 3 and 4 schematically illustrate non-exclusive examples of membrane assemblies 30 that may be used in hydrogen-processing assemblies according to the present disclosure. In some embodiments, membrane assemblies 30 may form at least a portion of a hydrogen-separation assembly 28. As schematically illustrated in FIGS. 3 and 4, membrane assemblies 30 may (but are not required to) be generally planar. That is, the membrane assemblies may have generally parallel opposing sides. Similarly, hydrogen-separation assemblies, which may include one or more membrane assemblies, may likewise (but are not required to) be generally planar. Membrane assemblies, and thus hydrogen-separation assemblies, according to the present disclosure include at least one hydrogen-selective membrane 54 and at least one harvesting region 78 that is adjacent to the permeate surface 58 of the at least one hydrogen-selective membrane. The harvesting region of a membrane assembly is a conduit, channel, or other region through which the permeate stream 48 travels, or flows, from the permeate surface 58 of the membrane to the permeate region of the internal volume.

In some embodiments, the harvesting region may be in direct fluid communication with the permeate region of the enclosure's internal volume, and thus also in direct fluid communication with the internal perimeter of the enclosure. In such an embodiment, the permeate gas stream flows directly from the harvesting region, which is at least substantially (if not completely) coextensive with the one or more hydrogen-selective membranes of the hydrogen-separation assembly, into the permeate region (which is exterior of the hydrogen-separation assembly) without flowing through a series of gasket-defined and/or manifold-defined flow passages.

The permeate stream may, in such an embodiment, exit the membrane assembly and/or the hydrogen-separation assembly in a direction that is generally parallel to the membrane, membrane assembly, and/or hydrogen-separation assembly. Stated differently, in some embodiments, the hydrogen-separation assembly may be configured so the permeate stream exits the membrane assembly and/or hydrogen-separation assembly in a direction generally parallel to the hydrogen-selective assembly. In some embodiments, the hydrogen-selective assembly may be configured to minimize the flow path, or length, through which the permeate gas must travel through the harvesting conduit membrane assembly Additionally or alternatively, in some embodiments, the hydrogen-separation assembly may be configured so the permeate stream exits the hydrogen-separation assembly in a direction generally parallel to the plane of the hydrogen-selective membrane. Additionally or alternatively, the hydro-gen-separation assembly may be adapted to receive the mixed gas stream 40 from a first direction and configured so the permeate stream exits the hydrogen-separation assembly in a second direction generally perpendicular to the first direction. Additionally or alternatively, the hydrogen-separation assembly may be configured so the permeate stream flows from the permeate surface to the permeate region in a direction generally parallel to the permeate surface of the membrane(s). Additionally or alternatively, the hydrogen-separation assembly may be configured so the permeate stream flows through the harvesting region in a direction that is generally parallel to the plane of the at least one hydrogen-selective membrane.

Some membrane assemblies according to the present disclosure may not include permeate gaskets that assist in forming gas seals about the periphery of the permeate surface of the hydrogen-selective membranes and adjacent structure. That is, such membrane assemblies according to the present disclosure may not include gaskets that provide seals around the entire perimeter of the permeate surface of hydrogen-selective membranes. The absence of a permeate gasket or other continuous seal associated with the permeate surface of a hydrogen-selective membrane may provide greater hydrogen separation and longer membrane life than some other configurations for membrane-based separation assemblies. The absence of the permeate gasket may reduce the likelihood of wrinkles, creases, or other forces on the hydrogen-selective membranes, such as responsive to thermal cycling of the membranes. This thermal cycling, and the resultant forces upon the membranes, may have a greater likelihood of causing holes, cracks, and/or leak paths to form in the membranes when permeate gaskets are used.

Harvesting region 78 may be defined by various structure(s) incorporated into a membrane assembly 30 or hydrogen-separation assembly 28 to support the membrane(s) such that the permeate surface(s) of the membrane(s) are supported in a manner that permits gas that passes through the membrane to be collected and extracted to form the permeate gas stream. For example, the harvesting region may be defined by a support, such as a screen structure 80 that includes at least one screen. Screen structure 80 may (but is not required to) include a plurality of screen members including screen members of varying coarseness. For example, screen structure 80 may include a coarse mesh screen sandwiched between fine mesh screens, where the terms "fine" and "coarse" are relative terms. In some embodiments, the outer screen members are selected to support membranes 54 without piercing the membranes and without having sufficient apertures, edges or other projections that may pierce, weaken or otherwise damage the membrane under the operating conditions with which assembly 10 is operated. Some embodiments of screen structure 80 may use a relatively coarser inner screen member to provide for enhanced, or larger, parallel flow conduits, although this is not required to all embodiments. In other words, the finer mesh screens may provide better protection for the membranes, while the coarser mesh screen(s) may provide better flow generally parallel to the membranes, and in some embodiments may be selected to be stiffer, or less flexible, than the finer mesh screens.

Additionally or alternatively, membrane assemblies may incorporate screen structure 80 directly adjacent the permeate surface of a hydrogen-selective membrane. In other words, membrane assemblies 30, and thus hydrogen-separation assemblies 28, may be constructed without a gasket directly adjacent the permeate surface of the membrane. Stated differently, in some embodiments, hydrogen-separation assemblies do not include a gasket between the permeate surface and the adjacent screen or other support structure.

The membrane assemblies that are schematically illustrated in FIGS. 3 and 4 may be described as having harvesting regions 78 that are generally parallel to the at least one hydrogen-selective membrane 54. Additionally or alternatively, the harvesting region may be described as being generally coextensive with the at least one hydrogen-selective membrane.

The non-exclusive example of a membrane assembly 30 illustrated in FIG. 3 includes only a single hydrogen-selective membrane, and may be referred to as a single-membrane assembly 88. Single-membrane assembly 88 includes a harvesting region 78 defined between the permeate surface 58 of the membrane and a barrier structure 82. Barrier structure 82 may be any suitable structure that includes a surface 84 generally opposed to the permeate surface 58 of membrane 54 and through which gas that permeates into the harvesting conduit does not pass. Instead, the barrier structure, which is generally opposed to the permeate surface of membrane 54 and spaced apart therefrom, defines a boundary that redirects the flow of permeate gas along the harvesting conduit. As illustrative, non-exclusive examples, barrier structure 82 may be a plate or other structure incorporated into a hydrogen-separation assembly. Additionally or alternatively, barrier structure 82 may be a wall of an enclosure, or other component, of a hydrogen-processing assembly according to the present disclosure. Any suitable structure that defines harvesting conduit 78 between itself and a hydrogen-selective membrane is within the scope of the present disclosure.

As schematically illustrated in FIG. 4, membrane assemblies (and thus hydrogen-separation assemblies) according to the present disclosure may include a plurality of hydrogen-selective membranes. The non-exclusive example of a membrane assembly 30 illustrated in FIG. 4 includes a pair of hydrogen-selective membranes 54, and may be referred to as a double-membrane assembly 90. In double-membrane assembly 90, the respective permeate surfaces 58 generally face each other and are spaced apart to define a harvesting region 78 through which the permeate stream flows to the permeate region of the internal volume of the enclosure. As discussed above, membrane assemblies 30, and thus double-membrane assemblies 90, may (but are not required to) include a screen structure 80 that defines the harvesting conduit. Stated differently, screen structure 80 may be generally coextensive with the spaced apart opposing permeate surfaces of a pair of hydrogen-selective membranes.

Additionally or alternatively, and as schematically illustrated in FIGS. 3 and 4, membrane assemblies 30 (and thus hydrogen-separation assemblies 28) according to the present disclosure may include suitable alternative support structure 86 that is configured to define a harvesting conduit. For example, support structure 86 may include a gasket or other spacer that generally creates a channel, conduit, or other suitable region adjacent the permeate surface(s) of one or more hydrogen-selective membranes. Stated differently, suitable support structure 86 may be configured to space a hydrogen-selective membrane away from either a corresponding hydrogen-selective membrane, as in a double-membrane assembly 90, or away from a suitable barrier structure 82, as in a single-membrane assembly 88, to define a channel, conduit, or other region therebetween that defines a harvesting region for the flow of a permeate stream from the one or more membranes to the permeate region of a hydrogen-processing assembly.

Figure 11:
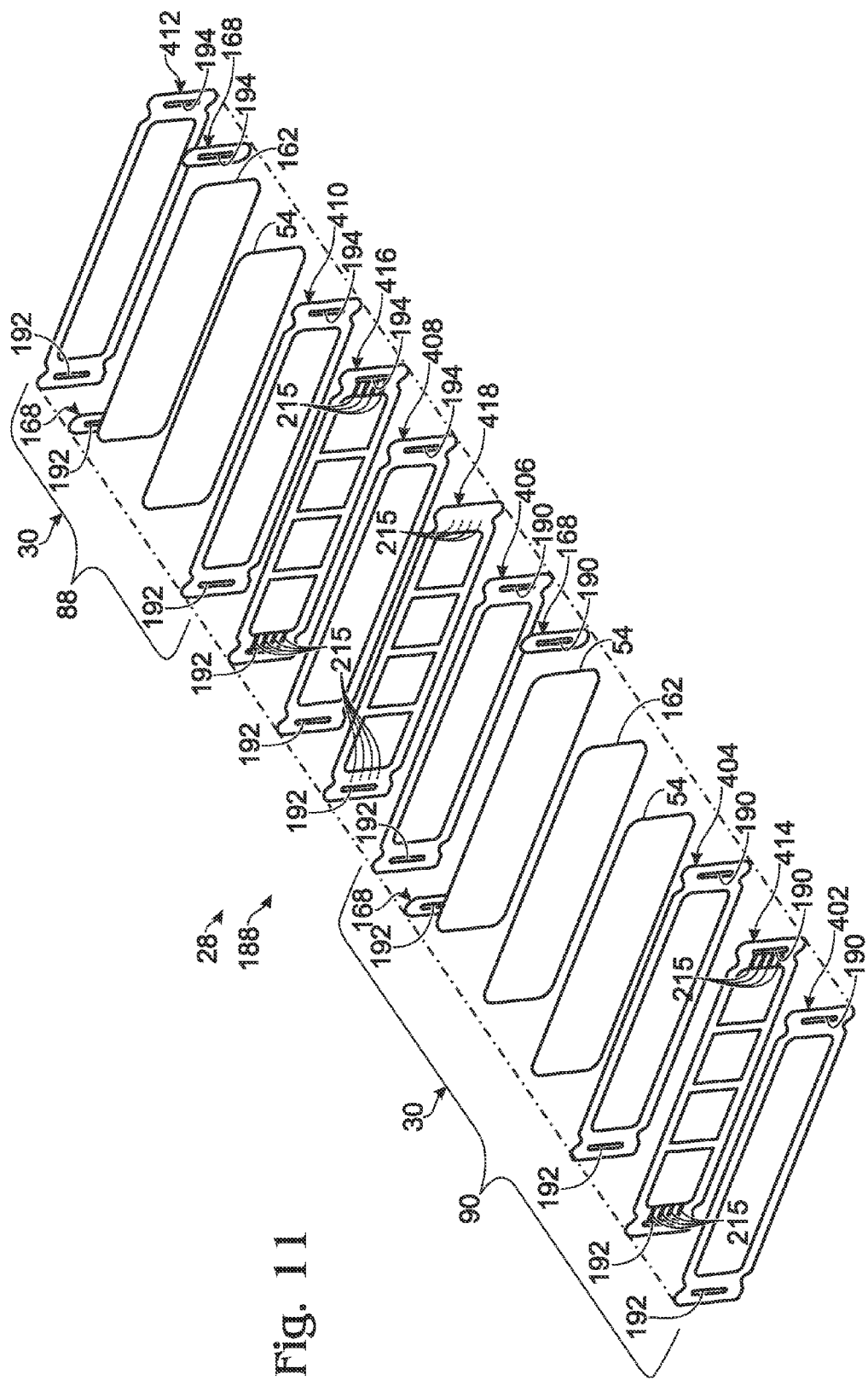
FIG. 11 is an exploded isometric view of an illustrative, non-exclusive example of another hydrogen-separation assembly according to the present disclosure.

Additionally or alternatively, hydrogen-separation assemblies according to the present disclosure may include more than one membrane assembly. Such assembly of multiple membrane assemblies may be described as membrane assemblies themselves or as hydrogen-separation assemblies. In some embodiments, a hydrogen-separation assembly may include membrane assemblies having various configurations. For example, a non-exclusive example of a hydrogen-separation assembly according to the present disclosure may include a single-membrane assembly 88 adjacent a double-membrane assembly 90. In such a configuration, the hydrogen-separation assembly may be described as including a plurality of spaced apart hydrogen-selective membranes including a pair of membranes with their respective permeate surfaces generally facing each other and spaced apart to define a harvesting region. The plurality of membranes may further include at least a third membrane with its mixed gas surface generally facing and spaced apart from the mixed gas surface of one of the membranes of the pair of membranes. In such a configuration, the space defined between the two mixed gas surfaces may define at least a portion of the mixed gas region of the enclosure of a hydrogen-processing assembly according to the present disclosure. Illustrative, non-exclusive examples of hydrogen-separation assemblies including these characteristics are illustrated in FIGS. 8 and 11 and are described in greater detail below.

FIGS. 5-11 illustrate various illustrative non-exclusive examples of embodiments of hydrogen-processing assemblies 10, and components thereof, according to the present disclosure. Assemblies 10 according to the present disclosure, while illustrated in FIGS. 5-11 with like numerals corresponding to the various components and portions thereof, etc. introduced above, are not limited to such illustrated configurations. For example, the shape, number, and location of various components, including, but not limited to, the input and output ports, the hydrogen-separation assembly, membrane assemblies within the hydrogen-separation assembly, the hydrogen-producing region (if any), etc. are not limited to the configurations illustrated. Illustrative, non-exclusive examples of enclosures having various shapes and configurations differing from those illustrated herein, and which may be used and/or modified to be used for hydrogen-processing assemblies according to the present disclosure are disclosed in U.S. Pat. Nos. 6,494,937, 6,569,227, 6,723,156, and 6,719,832, and U.S. patent application Ser. Nos. 11/263,726, and 11/638,076, the entire disclosures of which are hereby incorporated by reference for all purposes.

In FIG. 5, an example of a suitable construction for a hydrogen-processing assembly 10 that does not include a hydrogen-producing region is shown in an unassembled, exploded condition, and is generally indicated at 100. As shown in FIG. 5, the enclosure of assembly 100 includes a first body portion 22 and a second body portion 24. During assembly of assembly 100, hydrogen-separation assembly 28 is positioned in internal volume 16 so that the permeate region is defined between at least a portion of the perimeter 60 of the hydrogen-separation assembly and at least a portion of the inside perimeter 20 of the first body portion 22. In other words, the hydrogen-separation assembly is placed within the internal volume of the first body portion 16 so that it is in a spaced relation to the internal perimeter of the first body portion to define a permeate region therebetween. Then, the second body portion 24 is positioned at least partially within the opening to the first body portion 22 to compress the hydrogen-separation assembly within the internal volume. A seal weld or other suitable sealing mechanism or structure may then be applied at the interface of the body portions to create a fluid-tight interface. As discussed, it is within the scope of the present disclosure that any suitable retention mechanism may be used to provide a fluid-tight interface between the body portions of the enclosure and to further provide a suitable amount of compression to the hydrogen-separation assembly within the enclosure, such as to provide and/or maintain internal seals and/or flow paths between and/or within the various components of the hydrogen-separation assembly.

The non-exclusive illustrative example of enclosure 14 shown in FIG. 5 further includes an input port 36 for receiving a mixed gas stream for delivery to the mixed gas region of the internal volume, a product output port 46 for removal of the hydrogen-rich permeate stream, and a byproduct output port 50 for removal of byproduct gases.

The non-exclusive illustrative example of a hydrogen-separation assembly 28 illustrated in FIG. 5 may be described as generally planar, and as schematically illustrated by the multiple arrows extending from the top and bottom (as viewed in FIG. 5) of the hydrogen-separation assembly, the hydrogen-rich, or permeate, stream exits the hydrogen-separation assembly in a direction generally parallel to the plane of the hydrogen-separation assembly. Stated differently, the permeate stream exits the hydrogen-separation assembly and enters the permeate region of the internal volume from a direction generally parallel to the plane of the hydrogen-separation assembly and the hydrogen-selective membranes located therein. The hydrogen-separation assembly illustrated in FIG. 5 includes gas distribution conduits 140 and 170, which define at least portions of the mixed gas region and which provide flow paths for the mixed gas and byproduct streams, respectively, through the hydrogen-separation assembly. In other words, the mixed gas stream enters the enclosure via inlet 36. The portion of the mixed gas stream that does not pass through the hydrogen-selective membranes (that is, the byproduct stream 52) is forced into distribution conduit 170 and then out byproduct outlet port 50. The portion of the mixed gas stream that does pass through the hydrogen-selective membranes forms permeate stream 48, which is forced into the permeate region of the internal volume and subsequently expelled from the enclosure via product output port 46.

Enclosure 14 is also illustrated as including optional mounts 150, which may be used to position the enclosure 14 with respect to other components of a hydrogen generation system and/or fuel cell system, etc.

As shown in FIGS. 5-7, first body portion 22 may include at least one projection, or guide, 146 that extends into internal volume 16 to align or otherwise position the hydrogen-separation region within the internal volume of the enclosure. In FIG. 5, two pairs of guides 146 are illustrated, but it is within the scope of the present disclosure that no guides, one guide, or any number of guides may be utilized. When more than one guide is utilized, the guides may have the same or different sizes, shapes, and/or relative orientations within the enclosure.

As also shown in FIGS. 5-7, hydrogen-separation assembly 28 may include recesses 152 that are sized to receive the guides 146 of the body portion when the membrane assembly is inserted into internal volume 16. Stated differently, the recesses on the hydrogen-separation assembly are designed to align with the guides that extend into the enclosure's internal volume to position the hydrogen-separation assembly in a selected orientation within the compartment. Accordingly, the first body portion may be described as providing alignment guides for the hydrogen-separation assembly. In FIG. 5, it can be seen that second body portion 24 may also include recesses 152. Recesses 152 may guide, or align, the first and second portions when the portions are assembled to form the enclosure. The illustrated guides and recesses are not required to all enclosures and/or hydrogen-separation assemblies and/or components thereof according to the present disclosure.

As discussed and as somewhat schematically illustrated in FIGS. 6-7, at least a portion of the perimeter 60 of the hydrogen-separation assembly 28 does not seal against at least a portion of the internal perimeter 20 of the internal volume. Instead, a gas passage, or channel 176 exists between hydrogen-separation assembly 28 and the internal perimeter 20 to form at least a portion of the permeate region 34 of the internal volume. The size of passage 176 may vary within the scope of the present disclosure, and may be smaller than is depicted for the purpose of illustration. The hydrogen-rich gas, or permeate stream, may flow through this passage and be withdrawn from the enclosure through the product output port.

As illustrated in FIG. 6, hydrogen-separation assemblies 28 according to the present disclosure may (but are not required to) include spacers, or protrusions, 124 that extend from at least a portion of the outside perimeter 60 and aid in positioning the hydrogen-separation assembly within the enclosure in its spaced relation as described herein. For example, in the illustrated example, spacers 124 may be generally trapezoidal in shape and may extend from one or more of the various components that make up a hydrogen-separation assembly, although any suitable shape is within the scope of the present disclosure. In some embodiments, spacers 124 may extend from one or more of the feed plates and/or sealing plates that may be incorporated into a hydrogen-separation assembly. In some such embodiments, the spacers may be (but are not require to be) less than the full thickness of the associated plate. When used, spacers 124 do not extend across the entire thickness of the hydrogen-separation assembly so that they do not block the flow of permeate gas within the permeate region 34. The spacers extend from the hydrogen-separation assembly to, or toward, the inside perimeter of the internal enclosure, and in some embodiments may extend into contact with the internal enclosure.

Additionally or alternatively, spacers that extend from the inside perimeter 20 of the internal enclosure are equally within the scope of the present disclosure, and like spacers 124 may aid in the positioning of the hydrogen-separation assembly within the enclosure and thereby maintain the spaced relation between the two. Any suitable mechanism, component, and/or structure for maintaining the spaced relation between at least a portion of the outer perimeter of the hydrogen-separation assembly and the inside perimeter of the body of the enclosure is within the scope of the present disclosure.

An optional groove 126 may extend into the first body portion 22 of the enclosure, as illustrated in FIG. 6. Groove 126 may effectively enlarge the permeate region 34 and thereby aid in the flow of the permeate gas through gas passage 176 and thus permeate region 34 to the product output port 46 by increasing the space between at least a portion of the outer perimeter of the hydrogen-separation assembly and at least a portion of the inside perimeter of the body. The groove, when present, may be described as defining at least a portion of a permeate gas passage through which permeate gas flows from the hydrogen-separation assembly to the product output port. As mentioned above, the relative size of the channel 176, and further the groove 126, may vary within the scope of the present disclosure from that depicted in FIG. 6 for the purpose of illustration.

As illustrated in FIGS. 5-11, and as perhaps best seen in FIG. 7, the various plates and gaskets that form a hydrogen-separation assembly according to the present disclosure, may be sized with asymmetrical shapes so that these components may only be located in the enclosure in a predetermined configuration. This is not required, but it may assist in assembly of the components because they cannot be inadvertently positioned in the housing in a backwards or upside-down configuration. In the illustrative, non-exclusive example of a suitable asymmetrical shape, a corner region 128 of the hydrogen-separation assembly has a different shape than the other corner regions, with this difference being sufficient to permit that corner to be only inserted into one of the corresponding corner regions of the enclosure's internal volume. The non-exclusive example illustrated in FIG. 7 incorporates a more squared-off corner than the other three corners of the hydrogen-separation assemblies illustrated herein, although any suitable shape of one or more corner regions that facilitate proper positioning of the hydrogen-separation assembly within an enclosure are within the scope of the present disclosure. Additionally or alternatively, regions other than the corner regions may facilitate the same functionality. Accordingly, some enclosures according to the present disclosure may be described as being keyed, or indexed, to define the orientation of the gaskets, frames, supports and similar components that are stacked therein.

As also best illustrated in FIG. 7, some hydrogen-separation assemblies and enclosures according to the present disclosure may be configured so that the spaced relation between the two does not extend around the entire perimeters thereof. For example, and as illustrated in FIG. 7, the components that define a hydrogen-separation assembly and/or other components that may be housed within an enclosure according to the present disclosure may include an end region 130 that is shaped so as to not provide (or to at least minimally provide) a channel or space between the end region 130 and the inside perimeter 20 of the enclosure body. Such a configuration, together with the optional spacers 124 discussed above and illustrated in FIG. 6, may thereby aid in the positioning and maintaining of the hydrogen-separation assembly (and/or other components) in a spaced relation to the inside perimeter of the body of the enclosure. Additionally or alternatively, such a configuration may aid in the directing of the permeate gas that enters the channel 176 from the harvesting regions of the membrane assemblies to the product output port of the enclosure. That is, because the hydrogen purification process according of the present disclosure is a pressure driven process, reducing the distance required that the permeate gas has to travel to exit the enclosure reduces the pressure drop associated therewith and thereby may provide for greater hydrogen flux, as discussed above.

In FIG. 8, an illustrative, non-exclusive example of a suitable construction for a hydrogen-processing assembly 10 that includes a hydrogen-producing region 70 is shown in an unassembled, exploded condition, and is generally indicated at 120. Accordingly, in addition to the various components (and variants thereof) discussed above in regards to hydrogen-processing assembly 100 in FIG. 5, the hydrogen-processing assembly 120 illustrated in FIG. 7 further includes an input port 36 for receiving a feed stream 38 for delivery to hydrogen-producing region 70, and an access port 122 for loading and removing catalyst from the hydrogen-producing region. Assemblies 120 according to the present disclosure are not required to include a catalyst access port. During use of illustrated assembly 120 to produce and/or purify hydrogen gas, access port 122 may be capped off or otherwise sealed.

In FIG. 8, the second body portion 24 of assembly 120 is shown including an optional protrusion 123 that aligns generally with gas distribution conduit 140, and thereby may aid in the positioning of the hydrogen-separation assembly within the enclosure, in applying compression to the gas distribution conduits, and/or in maintaining the spaced relation between the hydrogen-separation assembly and the inside perimeter of the enclosure body. Second portion 24 may include more than one protrusion, or projecting rib, such as is illustrated in dashed lines at 123 to align generally with gas distribution conduit 170. In embodiments incorporating a protrusion 123, the protrusion may be configured to extend only far enough into the internal volume to properly align with the hydrogen-separation assembly and not prevent the flow of mixed-gas through conduit 140 to and/or from the membrane assemblies and/or other components.

An illustrative, non-exclusive example of a suitable construction for a hydrogen-separation assembly 28 that may be used in either hydrogen-processing assembly 100 or 120 is shown in FIG. 9 and indicated at 154. As illustrated, assembly 154 includes a plurality of membrane assemblies 30 that include hydrogen-selective membranes 54. The illustrated assembly 28 includes a single-membrane assembly 88 and a double-membrane assembly 90. Also shown are various porous membrane supports, or screens, 162, that define the harvesting regions of the membrane assemblies. Membrane assemblies 30 include sealing gaskets 168 that extend proximate the membranes and screens, but not around the perimeters of the membranes and screens, to provide seals for the gas distribution conduits 140, 170.

Various sealing gaskets 202, 204, 206, 208, 210, and 212, feed plates 214, 216, and sealing plate 218 are also provided. Plate 218 may also be referred to as a transition plate. In the illustrated example, the mixed gas region of the internal volume is at least partially defined by the internal spaces of the various sealing gaskets and feed plates and by the gas distribution conduits 140 and 170. Accordingly, in application, a mixed gas stream enters the mixed gas region via the internal space of sealing gasket 212. A portion of the mixed gas stream then travels into the conduit 140 via feed plate 216 to be distributed to the single-membrane assembly 88 and the near side (as viewed in FIG. 9) of the double-membrane assembly 90 to come into contact with the mixed gas surfaces of the hydrogen-selective membranes 54 via the feed plate 214 and sealing gaskets 204, 208, 210. The portion of the mixed gas stream that is not distributed via the gas conduit 170 travels through feed passage 215 in feed plate 216 to come into contact with the mixed gas surface of the far (as viewed in FIG. 9) hydrogen-selective membrane of double-membrane assembly 90. The portion of the mixed gas stream that does not pass through the hydrogen-selective membranes is pressure driven into gas conduit 170 via feed plate 214 to be expelled from the enclosure via the byproduct output port.

The portion of the mixed gas stream that does pass through the hydrogen-selective membranes to form the hydrogen-rich, or permeate, stream flows into the permeate region of the internal volume via screens 162 of membrane assemblies 30. Thereafter the permeate stream may be removed from the enclosure through the product output port.

Also illustrated in FIG. 9 are an optional catalyst retention plate 160 and sealing gasket 166 that may be used in hydrogen-processing assemblies according to the present disclosure that include a hydrogen-producing region 70, such as hydrogen-processing assembly 120 shown in FIG. 8 and discussed above. In application, the catalyst retention plate 160 retains the catalyst material within the hydrogen-producing region. Feed stream 38 enters hydrogen-producing region 70 via input port 36, and percolates through the catalyst material to form the mixed gas stream, which in the illustrated example of FIG. 9, enters the mixed gas region via slits or other apertures 167 in the retention plate. The mixed gas then travels through the hydrogen-separation assembly, as discussed above, to form both the permeate stream and the byproduct stream.

Figure 10:
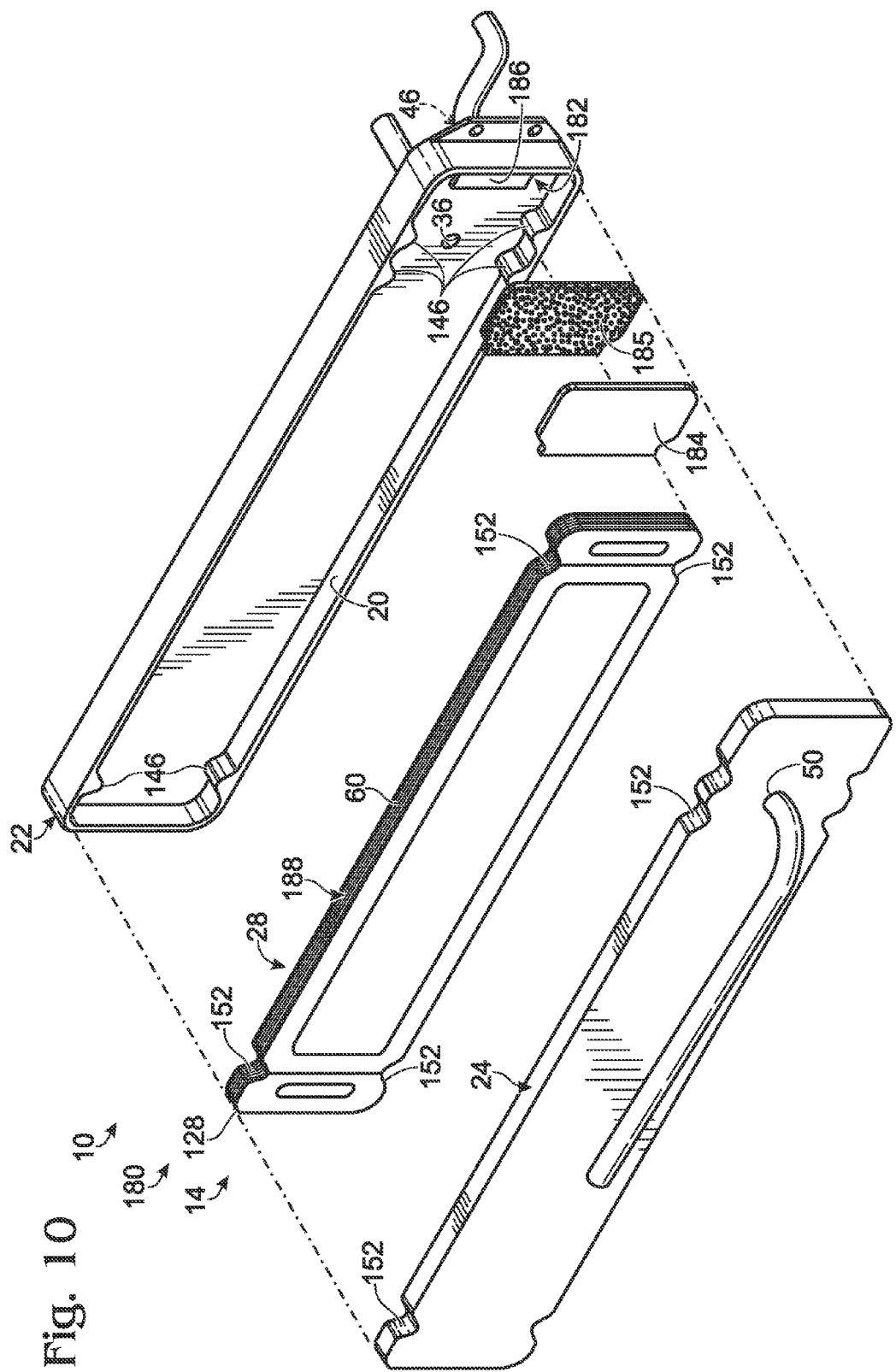
FIG. 10 is an exploded view of an illustrative, non-exclusive example of another hydrogen-processing assembly according to the present disclosure that includes a hydrogen-producing region.

In FIG. 10, another illustrative, non-exclusive example of a suitable construction for a hydrogen-processing assembly 10 that does not include a hydrogen-producing region is shown in an unassembled, exploded condition, and is generally indicated at 180. Assembly 180 includes an optional hydrogen-polishing region 182 that further purifies the permeate stream subsequent to being formed by the hydrogen-separation assembly 28. In the illustrated example, the hydrogen-polishing region incorporates a methanation catalyst, or methanation catalyst bed, 185 within the enclosure and held in place between a catalyst support plate 184, which may take the form of a compressible pad or support, and the inside surface of the enclosure adjacent the product output port 46. As illustrated, an additional support plate 186, which may take the form of a screen, may also be provided to generally prevent the catalyst material from being expunged through the product output port along with the purified hydrogen. Accordingly, plate 186 may include one or more apertures, or holes, that permit the purified hydrogen to pass, while retaining the catalyst bed within the polishing region 182. In the illustrated example of FIG. 10, the permeate stream, upon exiting the hydrogen-separation assembly, enters the permeate region defined by the outer perimeter 60 of the hydrogen-separation assembly and the inside perimeter 20 of the enclosure body, and is pressure driven into the hydrogen-polishing region, where, as described in more detail herein, compositions that may be harmful to downstream components of a fuel cell system, such as carbon monoxide for example, may be removed by the catalyst bed.

An illustrative, non-exclusive example of a suitable construction for a hydrogen-separation assembly 28 that may be used in hydrogen-processing assembly 180 is shown in FIG. 11, and indicated at 188. Like hydrogen-separation assembly 154 illustrated in FIG. 9, assembly 188 includes a plurality of membrane assemblies 30 that include hydrogen-selective membranes 54. Assembly 188 includes a single-membrane assembly 88 and a double-membrane assembly 90, both including porous membrane supports, or screens, 162, that define the harvesting regions of the membrane assemblies. As discussed, the number and type of membrane assemblies in separation assemblies according to the present disclosure may vary, including more or less membrane assemblies than are shown in the illustrated graphical examples. The membrane assemblies shown in FIG. 11 further include sealing gaskets 168 that extend proximate the membranes and screens, but not around the perimeters of the membranes and screens, to provide seals for the gas distribution conduits 190, 192, 194 that define a portion of the mixed gas region of the assembly.

Various sealing gaskets 402, 404, 406, 408, 410, and 412, feed plates 414, 416, and sealing plate, or transition feed plate, 418 are also provided. In the illustrated example, the mixed gas region of the internal volume is at least partially defined by the internal spaces of the various sealing gaskets and feed plates and by the gas distribution conduits 190, 192, and 194. As indicated, sealing plate 418 does not include a conduit passage on one end, thereby effectively separating gas conduits 190 and 194. Accordingly, in application, a mixed gas stream first enters the mixed gas region through gas conduit 190. The mixed gas stream then travels into the internal space of gasket 404 via feed passages 215 in feed plate 414, where it comes into contact with the mixed gas surface of the near (as viewed in FIG. 11) hydrogen-selective membrane 54 of the double-membrane assembly 90. The portion of the mixed gas stream that does not pass through the near membrane, travels into gas conduit 192 via feed plate 414 where it is then distributed to the internal space of gaskets 406, 408, 410, and sealing plate 418 to come into contact with the mixed gas surface of the far (as viewed in FIG. 11) membrane 54 of double-membrane assembly 90 and the membrane 54 of the single-membrane assembly 88. The portion of the mixed gas stream that does not pass through any of the membranes 54 is pressure driven into gas conduit 194 via feed plate 416 to be expelled from the enclosure as a byproduct stream via the byproduct output port of the enclosure.

The portion of the mixed gas stream that does pass through the hydrogen-selective membranes to form the hydrogen-rich or permeate stream, flows into the permeate region of the internal volume via screens 162 of membrane assemblies 30. Thereafter the permeate stream may be removed from the enclosure through the product output port. As discussed above, when hydrogen-separation assembly 188 is incorporated into hydrogen-processing assembly 180 illustrated in FIG. 10, the permeate stream is further purified in the hydrogen-polishing region, prior to exiting the enclosure via product output port 46.

During fabrication of the membrane assemblies and hydrogen-separation assemblies 28 of the present disclosure, adhesive may (but is not required to) be used to secure the membranes 54 to the screen structures 162 and/or to secure the components of the screen structures, as discussed in more detail in U.S. Pat. No. 6,319,306, the entire disclosure of which is hereby incorporated for all purposes. An example of a suitable adhesive is sold by 3M under the trade name SUPER 77. The adhesive may be at least substantially, if not completely, removed after fabrication of the membrane assembly so as not to interfere with the permeability, selectivity and flow paths of the gases. An example of a suitable method for removing adhesive from the membranes and/or screen structures or other supports is by exposure to oxidizing conditions prior to initial operation of assembly 10. The objective of the oxidative conditioning is to burn out the adhesive without excessively oxidizing the membrane. A suitable procedure for such oxidizing is disclosed in U.S. Pat. No. 6,319,306.

It is also within the scope of the present disclosure that the screen members, when utilized, may be otherwise secured together, such as by sintering, welding, brazing, diffusion bonding and/or with a mechanical fastener. It is also within the scope of the present disclosure that the screen members, when utilized, may not be coupled together other than by being compressed together in the hydrogen-separation assembly of a hydrogen-processing assembly. Screens 162 may (but are not required to) include a coating on the surfaces that engage the permeate surfaces of membranes 54. Examples of suitable coatings are disclosed in U.S. Pat. No. 6,569,227, incorporated above.

Other examples of attachment mechanisms that achieve gas-tight seals between the various components forming membrane assemblies 30 and hydrogen-separation assemblies 28 include one or more of brazing, gasketing, and welding.

It is within the scope of the present disclosure that the various gaskets, plates, and/or other components of membrane assemblies and/or hydrogen-separation assemblies discussed herein do not all need to be formed from the same materials and/or do not necessarily have the same dimensions, such as the same thicknesses. For example, illustrative, non-exclusive examples of suitable gaskets that may be used are flexible graphite gaskets, including those sold under the trade name GRAFOIL™ by Union Carbide, although other materials may be used, such as depending upon the operating conditions under which an assembly 10 is used. Various structural components may be formed from stainless steel or one or more other suitable structural materials discussed in the above-incorporated patents and applications.

Figure 12:
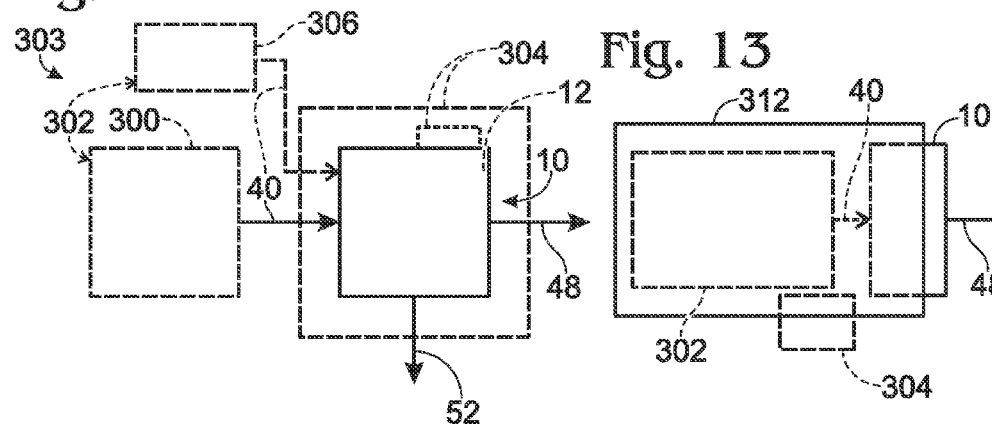
FIG. 12 is a schematic diagram of a fuel-processing system that includes a hydrogen-processing assembly according to the present disclosure and a source of hydrogen gas to be purified in the hydrogen-processing assembly.

An illustrative, non-exclusive example of a hydrogen-processing assembly 10 that is adapted to receive mixed gas stream 40 from a source of hydrogen gas to be purified is schematically illustrated in FIG. 12. As shown, illustrative, non-exclusive examples of hydrogen sources are indicated generally at 302 and include a hydrogen-producing fuel processor 300 and a hydrogen storage device 306. In FIG. 12, a fuel processor is generally indicated at 300, and the combination of a fuel processor and a hydrogen-purification device, or hydrogen-processing assembly 10, may be referred to as a hydrogen-producing fuel-processing system 303. Also shown in dashed lines at 304 is a heating assembly, which may be provided to provide heat to assembly 10 and may take a variety of forms. Fuel processor 300 may take any suitable form including, but not limited to, the various forms of hydrogen-producing region 70 discussed above. The schematic representation of fuel processor 300 in FIG. 12 is meant to include any associated heating assemblies, feedstock delivery systems, air delivery systems, feed stream sources or supplies, etc. Illustrative, non-exclusive examples of suitable hydrogen storage devices 306 include hydride beds and pressurized tanks.

Figure 13:
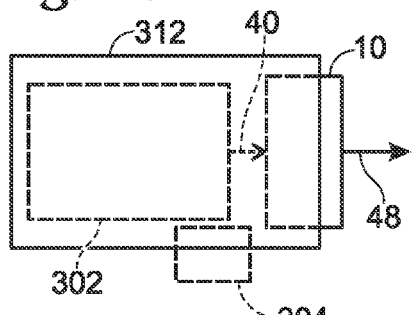
FIG. 13 is a schematic diagram of a fuel-processing system that includes a hydrogen-producing fuel processor integrated with a hydrogen-processing assembly according to the present disclosure.

Fuel processors are often operated at elevated temperatures and/or pressures. As a result, it may be desirable to at least partially integrate hydrogen-processing assembly 10 with fuel processor 300, as opposed to having assembly 10 and fuel processor 300 connected by external fluid transportation conduits. An example of such a configuration is shown in FIG. 13, in which the fuel processor includes a shell or housing 312, which device 10 forms a portion of and/or extends at least partially within. In such a configuration, fuel processor 300 may be described as including device 10. Integrating the fuel processor or other source of mixed gas stream 40 with hydrogen-processing assembly 10 enables the devices to be more easily moved as a unit. It also enables the fuel processing system's components, including assembly 10, to be heated by a common heating assembly and/or for at least some, if not all, of the heating requirements of assembly 10 to be satisfied by heat generated by processor 300.

Figure 14:
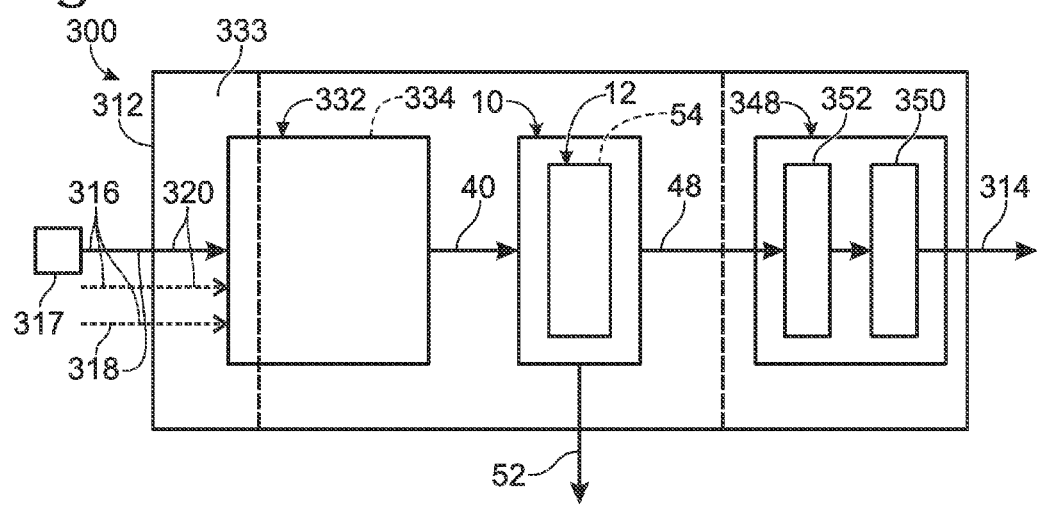
FIG. 14 is a schematic diagram of another fuel processor system that includes a hydrogen-producing fuel processor and an integrated hydrogen-processing assembly according to the present disclosure.

As discussed, fuel processor 300 is any suitable device that produces a mixed gas stream containing hydrogen gas, and preferably a mixed gas stream that contains a majority of hydrogen gas. For purposes of illustration, the following discussion will describe fuel processor 300 as being adapted to receive a feed stream 316 containing a carbon-containing feedstock 318 and water 320, as shown in FIG. 14. However, it is within the scope of the present disclosure that the fuel processor 300 may take other forms, and that feed stream 316 may have other compositions, such as containing only a carbon-containing feedstock or only water.

Feed stream 316 may be delivered to fuel processor 300 via any suitable mechanism. A single feed stream 316 is shown in FIG. 14, but it should be understood that more than one stream 316 may be used and that these streams may contain the same or different components. When the carbon-containing feedstock 318 is miscible with water, the feedstock may be delivered with the water component of feed stream 316, such as shown in FIG. 14. When the carbon-containing feedstock is immiscible or only slightly miscible with water, these components may be delivered to fuel processor 300 in separate streams, such as shown in dashed lines in FIG. 14. In FIG. 14, feed stream 316 is shown being delivered to fuel processor 300 by a feed stream delivery system 317. Delivery system 317 includes any suitable mechanism, device, or combination thereof that delivers the feed stream to fuel processor 300. For example, the delivery system may include one or more pumps that deliver the components of stream 316 from a supply. Additionally or alternatively, delivery system 317 may include a valve assembly adapted to regulate the flow of the components from a pressurized supply. The supplies may be located external the fuel cell system, or may be contained within or adjacent the system.

As generally indicated at 332 in FIG. 14, fuel processor 300 includes a hydrogen-producing region in which mixed gas stream 40 is produced from feed stream 316. As discussed, a variety of different processes may be utilized in the hydrogen-producing region. An example of such a process is steam reforming, in which region 332 includes a steam reforming catalyst 334. As discussed, other hydrogen-producing mechanisms may be utilized without departing from the scope of the present disclosure. As discussed, in the context of a steam or autothermal reformer, mixed gas stream 40 may also be referred to as a reformate stream. The fuel processor may be adapted to produce substantially pure hydrogen gas, or even pure hydrogen gas. For the purposes of the present disclosure, substantially pure hydrogen gas may be greater than 90% pure, greater than 95% pure, greater than 99% pure, greater than 99.5% pure, or greater than 99.9% pure. Illustrative, non-exclusive examples of suitable fuel processors are disclosed in U.S. Pat. Nos. 6,221,117 and 6,319,306, incorporated above, and U.S. Patent Application Publication No. 2001/0045061, the complete disclosure of which is hereby incorporated by reference in its entirety for all purposes.

Fuel processor 300 may, but does not necessarily, further include a polishing region 348, such as shown in FIG. 14. Polishing region 348 receives hydrogen-rich stream 48 from assembly 10 and further purifies the stream by reducing the concentration of, or removing, selected compositions therein. In FIG. 14, the resulting stream is indicated at 314 and may be referred to as a product hydrogen stream or purified hydrogen stream. When fuel processor 300 does not include polishing region 348, hydrogen-rich stream 48 forms product hydrogen stream 314. For example, when stream 48 is intended for use in a fuel cell stack, compositions that may damage the fuel cell stack, such as carbon monoxide and carbon dioxide, may be removed from the hydrogen-rich stream, if necessary. The concentration of carbon monoxide may be less than 10 ppm (parts per million) to prevent the control system from isolating the fuel cell stack. For example, the system may limit the concentration of carbon monoxide to less than 5 ppm, or even less than 1 ppm. The concentration of carbon dioxide may be greater than that of carbon monoxide. For example, concentrations of less than 25% carbon dioxide may be acceptable. For example, the concentration of carbon dioxide may be less than 10%, or even less than 1%. Concentrations of carbon dioxide may be less than 50 ppm. It should be understood that the concentrations presented herein are illustrative examples, and that concentrations other than those presented herein may be used and are within the scope of the present disclosure. For example, particular users or manufacturers may require minimum or maximum concentration levels or ranges that are different than those identified herein.

Region 348 includes any suitable structure for removing or reducing the concentration of the selected compositions in stream 48. For example, when the product stream is intended for use in a proton exchange membrane (PEM) fuel cell stack or other device that will be damaged if the stream contains more than determined concentrations of carbon monoxide or carbon dioxide, it may be desirable to include at least one methanation catalyst bed 350. Bed 350 converts carbon monoxide and carbon dioxide into methane and water, both of which will not damage a PEM fuel cell stack. Polishing region 348 may also include another hydrogen-producing region 352, such as another reforming catalyst bed, to convert any unreacted feedstock into hydrogen gas. In such an embodiment, the second reforming catalyst bed may be upstream from the methanation catalyst bed so as not to reintroduce carbon dioxide or carbon monoxide downstream of the methanation catalyst bed.

Steam reformers typically operate at temperatures in the range of 200° C. and 900° C., and at pressures in the range of 50 psi and 1000 psi, although temperatures outside of this range are within the scope of the present disclosure, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel-processing or fuel cell system, by an external source, or both.

In FIG. 14, fuel processor 300 is shown including a shell 312 in which the above-described components are contained. Shell 312, which also may be referred to as a housing, enables the components of the fuel processor to be moved as a unit. It also protects the components of the fuel processor from damage by providing a protective enclosure and reduces the heating demand of the fuel processor because the components of the fuel processor may be heated as a unit. Shell 312 may, but does not necessarily, include insulating material 333, such as a solid insulating material, blanket insulating material, or an air-filled cavity. It is within the scope of the present disclosure, however, that the fuel processor may be formed without a housing or shell. When fuel processor 300 includes insulating material 333, the insulating material may be internal the shell, external the shell, or both. When the insulating material is external a shell containing the above-described reforming, separation and/or polishing regions, the fuel processor may further include an outer cover or jacket external the insulation.

It is further within the scope of the present disclosure that one or more of the components of fuel processor 300 may either extend beyond the shell or be located external at least shell 312. For example, assembly 10 may extend at least partially beyond shell 312, as indicated in FIG. 13. As another example, and as schematically illustrated in FIG. 14, polishing region 348 may be external of shell 312 and/or a portion of hydrogen-producing region 332 (such as portions of one or more reforming catalyst beds) may extend beyond the shell.

Figure 15:
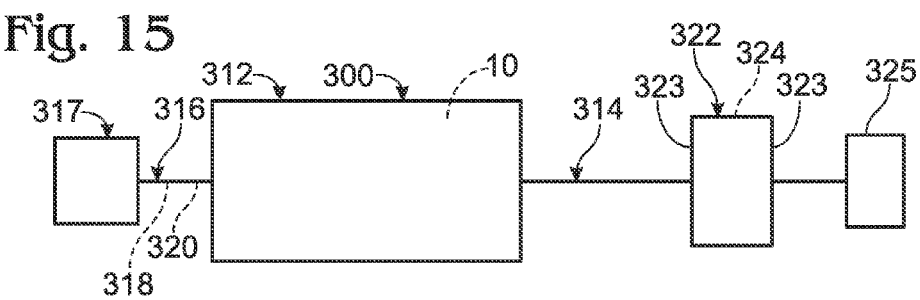
FIG. 15 is a schematic diagram of a fuel cell system that includes a hydrogen-processing assembly according to the present disclosure.

As indicated above, fuel processor 300 may be adapted to deliver hydrogen-rich stream 48 or product hydrogen stream 314 to at least one fuel cell stack, which produces an electric current therefrom. In such a configuration, the fuel processor and fuel cell stack may be referred to as a fuel cell system. An example of such a system is schematically illustrated in FIG. 15, in which a fuel cell stack is generally indicated at 322. The fuel cell stack is adapted to produce an electric current from the portion of product hydrogen stream 314 delivered thereto. In the illustrated embodiment, a single fuel processor 300 and a single fuel cell stack 322 are shown and described, however, more than one of either or both of these components may be used. It should be understood that these components have been schematically illustrated and that the fuel cell system may include additional components that are not specifically illustrated in the figures, such as feed pumps, air delivery systems, heat exchangers, heating assemblies and the like.

Fuel cell stack 322 contains at least one, and typically multiple, fuel cells 324 that are adapted to produce an electric current from the portion of the product hydrogen stream 314 delivered thereto. This electric current may be used to satisfy the energy demands, or applied load, of an associated energy-consuming device 325. Illustrative examples of devices 325 include, but should not be limited to, a motor vehicle, recreational vehicle, boat, tools, lights or lighting assemblies, appliances (such as a household or other appliance), household, signaling or communication equipment, etc. It should be understood that device 325 is schematically illustrated in FIG. 15 and is meant to represent one or more devices or collection of devices that are adapted to draw electric current from the fuel cell system. A fuel cell stack typically includes multiple fuel cells joined together between common end plates 323, which contain fluid delivery/removal conduits (not shown). Examples of suitable fuel cells include PEM fuel cells and alkaline fuel cells. Fuel cell stack 322 may receive all of product hydrogen stream 314. Some or all of stream 314 may additionally, or alternatively, be delivered, via a suitable conduit, for use in another hydrogen-consuming process, burned for fuel or heat, or stored for later use.

INDUSTRIAL APPLICABILITY

The present disclosure, including fuel-processing systems, hydrogen-processing assemblies, fuel cell systems, and components thereof, is applicable to the fuel-processing and other industries in which hydrogen gas is purified, produced and/or utilized.

In the event that any of the references that are incorporated by reference herein define a term in a manner or are otherwise inconsistent with either the non-incorporated disclosure of the present application or with any of the other incorporated references, the non-incorporated disclosure of the present application shall control and the term or terms as used therein only control with respect to the patent document in which the term or terms are defined.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

The invention claimed is:
1. A hydrogen-purification assembly configured to receive a mixed gas stream and to produce a product hydrogen stream and a byproduct stream therefrom, the hydrogen-purification assembly comprising:
   an enclosure including an internal surface and defining an internal volume, wherein the internal volume includes a mixed gas region and a permeate region, and further wherein the internal surface defines at least a portion of the permeate region;

a hydrogen-separation assembly positioned within the internal volume in a spaced-apart relation to at least a portion of the internal surface, wherein the hydrogen-separation assembly includes a plurality of generally planar hydrogen-selective membranes, wherein the hydrogen-separation assembly defines the mixed gas region and isolates the mixed gas region from the internal surface of the enclosure, and further wherein the product hydrogen stream is formed from a portion of the mixed gas stream that passes through at least one of the plurality of generally planar hydrogen-selective membranes and from the mixed gas region to the permeate region;

a mixed gas stream input port configured to provide a mixed gas inlet for delivery of the mixed gas stream to the mixed gas region of the hydrogen-purification assembly;

a byproduct stream output port configured to provide a byproduct outlet for withdrawal of the byproduct stream from the mixed gas region of the hydrogen-purification assembly; and a product hydrogen stream output port configured to provide a hydrogen outlet for withdrawal of the product hydrogen stream from the permeate region of the hydrogen-purification assembly.

2. The hydrogen-purification assembly of claim 1, wherein the hydrogen-separation assembly entirely defines the mixed gas region.

3. The hydrogen-purification assembly of claim 1, wherein the hydrogen-separation assembly is contained entirely within the internal volume.

4. The hydrogen-purification assembly of claim 1, wherein the hydrogen-separation assembly includes an external surface including a plurality of sides, and further wherein each of the plurality of sides is contained within the internal volume.

5. The hydrogen-purification assembly of claim 4, wherein at least two of the plurality of sides is in fluid communication with the permeate region.

6. The hydrogen-purification assembly of claim 4, wherein at least two of the plurality of sides define at least a portion of the permeate region.

7. The hydrogen-purification assembly of claim 1, wherein the internal surface is not in fluid communication with the mixed gas stream.

8. The hydrogen-purification assembly of claim 1, wherein the mixed gas stream includes hydrogen gas and other gasses, wherein the product hydrogen stream includes at least one of a greater concentration of hydrogen gas and a lower concentration of the other gasses than the mixed gas stream, and further wherein the byproduct stream includes at least a substantial portion of the other gasses.

9. The hydrogen-purification assembly of claim 1, wherein the permeate region is defined by a majority of the internal surface of the enclosure.

10. The hydrogen-purification assembly of claim 9, wherein the permeate region is defined by substantially all of the internal surface of the enclosure.

11. The hydrogen-purification assembly of claim 1, wherein the plurality of hydrogen-selective membranes includes palladium.

12. The hydrogen-purification assembly of claim 1, wherein the plurality of hydrogen-selective membranes includes at least one pair of generally opposed hydrogen-selective membranes, wherein each of the pair of generally opposed hydrogen-selective membranes includes a mixed gas surface configured to be in fluid communication with the mixed gas stream and a permeate surface configured to be in fluid communication with the product hydrogen stream, wherein the permeate surfaces of the pair of generally opposed hydrogen-selective membranes define at least a portion of the permeate region, and further wherein the mixed gas surfaces of the pair of generally opposed hydrogen-selective membranes define at least a portion of the mixed gas region.

13. The hydrogen-purification assembly of claim 12, wherein the mixed gas surfaces of the plurality of hydrogen-selective membranes define a majority of the mixed gas region.

14. The hydrogen-purification assembly of claim 12, wherein the mixed gas surfaces of the plurality of hydrogen-selective membranes define substantially all of the mixed gas region.

15. The hydrogen-purification assembly of claim 12, wherein the hydrogen-separation assembly does not include a seal extending between the permeate surfaces of the pair of generally opposed hydrogen-selective membranes.

* * * * *